(12) United States Patent
Richter et al.

(10) Patent No.: US 12,333,165 B2
(45) Date of Patent: *Jun. 17, 2025

(54) CONFIGURING COMMAND/ADDRESS CHANNEL FOR MEMORY

(71) Applicant: Micron Technology, Inc., Boise, ID (US)

(72) Inventors: Michael Dieter Richter, Ottobrunn (DE); Wolfgang Anton Spirkl, Germering (DE); Thomas Hein, Munich (DE); Peter Mayer, Neubiberg (DE); Martin Brox, Munich (DE)

(73) Assignee: Micron Technology, Inc., Boise, ID (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/890,772

(22) Filed: Aug. 18, 2022

(65) Prior Publication Data

US 2022/0391114 A1 Dec. 8, 2022

Related U.S. Application Data

(63) Continuation of application No. 16/674,987, filed on Nov. 5, 2019, now Pat. No. 11,449,249.

(Continued)

(51) Int. Cl.
*G06F 1/24* (2006.01)
*G06F 3/06* (2006.01)
(Continued)

(52) U.S. Cl.
CPC .......... *G06F 3/0632* (2013.01); *G06F 3/0604* (2013.01); *G06F 3/0673* (2013.01); *G06N 3/045* (2023.01); *G06N 3/08* (2013.01)

(58) Field of Classification Search
CPC ........ G01P 1/07; G01P 15/0891; G01P 15/18; G06F 1/3296; G06F 9/4418;
(Continued)

(56) References Cited

U.S. PATENT DOCUMENTS 8,200,879 B1 * 6/2012 Falik ................ G11C 5/02
710/65
2006/0041704 A1 * 2/2006 Choi .................... G11C 7/1048
711/100

(Continued)

FOREIGN PATENT DOCUMENTS

CN 101169772 A 4/2008

OTHER PUBLICATIONS

Korean Patent Office, "Office Action," issued in connection with Korean Patent Application No. 10-2021-7018718 dated May 26, 2023 (22 pages with translation).

(Continued)

*Primary Examiner* — Xuxing Chen
(74) *Attorney, Agent, or Firm* — Holland & Hart LLP

(57) ABSTRACT

Methods, systems, and devices for memory operations that support configuring a channel, such as a command/address (C/A) channel, are described. A configuration of a C/A channel may be dynamically adapted based on power saving considerations, control information execution latency, or both. Configuring a C/A channel may include determining a quantity of pins, or a quantity of cycles, both for communicating control information over the C/A channel. The quantity of pins may be determined based on previous control information transmissions, characteristics of a memory device, or predicted control information transmissions, or any combination thereof in some cases. The deter- (Continued)

mined quantity of pins, quantity of cycles, or both may be explicitly or implicitly indicated to other devices (e.g., that use the C/A channel).

20 Claims, 10 Drawing Sheets

Related U.S. Application Data

(60) Provisional application No. 62/771,420, filed on Nov. 26, 2018.

(51) Int. Cl.
*G06F 9/00* (2018.01)
*G06N 3/045* (2023.01)
*G06N 3/08* (2023.01)

(58) Field of Classification Search
CPC ...... G06F 1/3206; G06F 1/324; G06F 1/3287; G07C 5/008; Y02D 30/70
See application file for complete search history.

(56) References Cited

U.S. PATENT DOCUMENTS

| | | | |
|---|---|---|---|
| 2007/0094437 A1* | 4/2007 | Jabori | ............ G06F 1/206 710/307 |
| 2008/0106967 A1 | 5/2008 | Oh | |
| 2008/0201548 A1 | 8/2008 | Przybylski et al. | |
| 2008/0288715 A1* | 11/2008 | Maddali | ............ G11C 16/20 711/204 |
| 2010/0223426 A1 | 9/2010 | Perego et al. | |
| 2011/0004742 A1 | 1/2011 | Hassan | |
| 2014/0181333 A1* | 6/2014 | Bains | ............ G06F 13/1668 710/16 |
| 2016/0103778 A1 | 4/2016 | Lesartre et al. | |
| 2017/0131933 A1* | 5/2017 | Kim | ............ G06F 30/392 |
| 2017/0270063 A1 | 9/2017 | Yamanaka et al. | |
| 2017/0371815 A1 | 12/2017 | Liu et al. | |
| 2018/0081774 A1 | 3/2018 | Kawamura et al. | |
| 2018/0114564 A1 | 4/2018 | Desimone et al. | |
| 2018/0314655 A1 | 11/2018 | Sadowski et al. | |
| 2019/0121775 A1 | 4/2019 | Johnson et al. | |

OTHER PUBLICATIONS

European Search Report received for EP Patent Application No. 19889637.5, mailed on Feb. 16, 2022, 7 pages.

International Search Report and Written Opinion received for PCT Patent Application No. PCT/US19/62500, mailed on Mar. 9, 2020, 9 pages.

Chinese patent office, "China Office Action," issued in connection with China Patent Application No. 201980085381.9 dated Jan. 17, 2024 (23 pages) (11 pages of English Translation and 12 pages of Original Document).

* cited by examiner

800

CONFIGURING COMMAND/ADDRESS CHANNEL FOR MEMORY

CROSS REFERENCE

The present Application for Patent is a continuation of U.S. patent application Ser. No. 16/674,987 by Richter et al., entitled "CONFIGURING COMMAND/ADDRESS CHANNEL FOR MEMORY", filed Nov. 5, 2019, which claims the benefit of U.S. Provisional Patent Application No. 62/771,420 by Richter et al., entitled "CONFIGURING COMMAND/ADDRESS CHANNEL FOR MEMORY", filed Nov. 26, 2018, each of which is assigned to the assignee hereof, and each of which is expressly incorporated by reference in its entirety.

BACKGROUND

The following relates generally to operating a memory device and more specifically to configuring a command/address (C/A) channel.

Memory devices are widely used to store information in various electronic devices such as computers, wireless communication devices, cameras, digital displays, and the like. Information is stored by programing different states of a memory device. For example, binary devices have two states, often denoted by a logic "1" or a logic "0." In other systems, more than two states may be stored. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory (e.g., FeRAM, PCM, RRAM) may maintain their stored logic state for extended periods of time even in the absence of an external power source. Volatile memory devices (e.g., DRAM) may lose their stored state over time unless they are periodically refreshed by an external power source.

Control information for operating/accessing a memory device may be communicated between an external controller and a memory device. In some cases, channels between a host device and a memory device may use one or more pins for communication.

DETAILED DESCRIPTION

Figure 1:
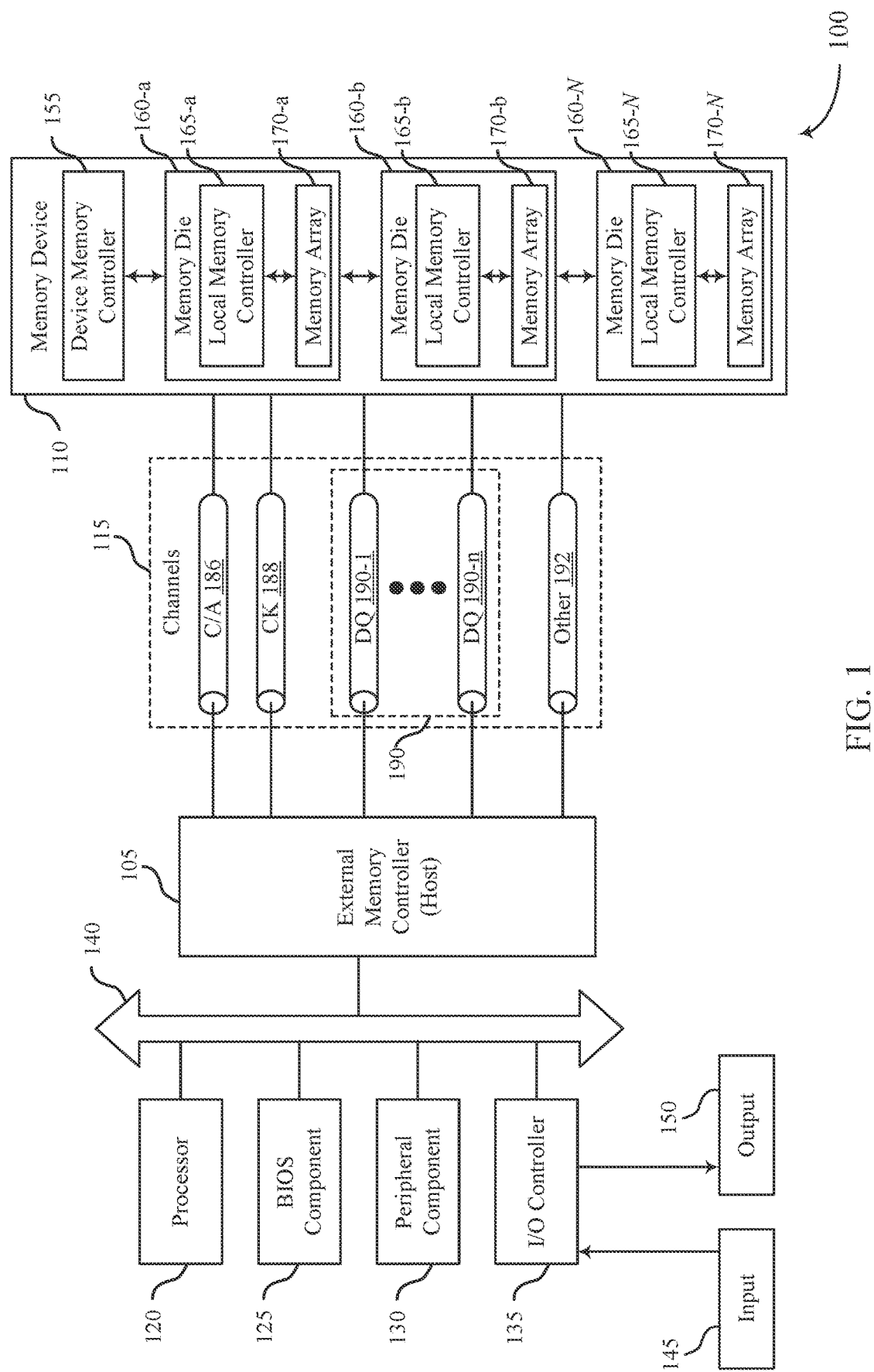
FIG. 1 illustrates aspects of an exemplary system that supports configuring a command/address (C/A) channel as disclosed herein.

Data and control information may be communicated in a system that supports the processing and storage of data. In some cases, data may include information for operating a user application, such as data for a word processing application. For memory access operations, control information may be used to enable the storing and reading of data in a memory array.

In some, cases, control information is generated at an external controller (or "host device") to access (e.g., to read to or write from) a memory array—e.g., in response to receiving a request from a user application to access or to store data in the memory array. In some cases, the generated control information includes a command for accessing the memory array. Some commands for accessing a memory array include an activation ("ACT") command, a read ("RD") command, a write ("WR") command, and a precharge ("PRE") command. The generated control information may also include a memory address that indicates a memory cell or set of memory cells that are subject to a corresponding command. A memory address may include a memory bank address, a row address, and/or a column address. Commands that are associated with a row address may be referred to as "row commands" and commands that are associated with a column address may be referred to as "column commands." In some cases, a size of certain command/address (C/A) combinations is larger than a size of other C/A combinations—e.g., a row ACT command may be larger than a column read command.

After the control information is generated, an information signal representing the control information may be produced at the external controller. To deliver the signal to the memory array, the external controller may apply the information signal to pins (or "nodes") located at the external controller. The pins may provide an interface between the interior of the external controller and a transmission path that connects the external controller to other devices in a system, such as the memory device. That is, pins may be used to distribute internally generated signals from one device to another device. In some examples, multiple pins may be used to communicate information signals that simultaneously convey multiple bits of information. In some cases, as the quantity of pins used to communicate an information signal increases, the amount of information bits that may be conveyed in a particular period of time also increases. However, a footprint (or physical size) of a device often increases as the quantity of pins at the device increases.

In some examples, to avoid increasing a footprint of a device, a device may be configured with a decreased quantity of pins for transmitting an information signal. Additionally, power consumption at a device may be decreased by using less pins. But as suggested above, decreasing the quantity of pins may decrease the amount of information bits that can be conveyed in a particular period of time. Thus, larger pieces of information—e.g., a row ACT command—may be communicated over multiple time periods (or "cycles")—e.g., because all of the bits included in the row ACT command cannot be sent in a single cycle over the decreased quantity of pins. And increasing the duration of information transmissions may introduce latency into a memory system—e.g., by delaying the execution of other commands—and/or decrease the throughput of a memory system.

In some cases, control information is signaled serially over a C/A channel—e.g., a row ACT command may be sent, then a PRE command, and so on. In such cases, an increase in transmission time for one command may delay the transmission of one or more subsequent commands. In some cases, serially transmitted commands may otherwise be processed in parallel (e.g., concurrently) at a memory device; thus, delaying the transmission of subsequent commands may introduce additional latency into a memory system. In some examples, the transmission delay for commands may be decreased by concurrently transmitting row commands over a row C/A channel and column commands over a column C/A channel. That said, some delay in transmitting commands may remain—e.g., between consecutive row and/or column commands.

Also, when larger commands, like row ACT commands, are sent at a high rate, the latency introduced into the memory system by increasing command transmission time may be compounded. The ratio at which row ACT commands are issued may be referred to as a "page hit rate"—a high page hit rate is associated with a low rate of ACT commands. Thus, decreasing the pins used at a device may save power at the device but introduce latency into information transmissions from the device, while increasing the pins used at a device may reduce latency in the information transmissions but increase a footprint and power consumption of the device.

To reduce power consumption at a device while mitigating latency in the transmission and execution of consecutive control information, the quantity of pins and/or cycles used to communicate control information may be dynamically configured.

In some cases, the quantity of pins and/or cycles used to communicate control information may be configured based on previously observed information. For example, an external memory controller may activate additional pins after identifying that a quantity of control information waiting to be sent has exceeded a threshold or by counting a quantity of unused command slots over a past period of time. After or concurrently with activating the additional pins, the external memory controller may also reduce a quantity of cycles used to transmit control information. By reducing the amount of time for transmitting individual pieces of control information, a backlog of control information in a queue may be reduced. Similarly, the external memory controller may deactivate certain pins and increase a quantity of cycle used to transmit control information after identifying that a quantity of control information waiting to be sent is below a threshold.

In some cases, the quantity of pins and/or cycles used to communicate control information may be adapted based on currently observed information. For example, an external memory controller may deactivate a quantity of pins after identifying that a temperature of the memory device is below a threshold—e.g., because less refresh commands may be sent at lower temperatures.

In some cases, the quantity of pins and/or cycles used to communicate control information is adapted based on predicted information. For example, an external memory controller may deactivate a quantity of pins after identifying that a page hit rate for the memory device exceeds a threshold value. A page hit rate may be associated with a quantity of times a row of memory cells in a memory bank is accessed before another row of memory cells in the same memory bank is accessed.

In any event, the external memory controller may indicate to a memory device how many and/or which pins are activated at the memory controller, and the memory device may similarly activate those pins to receive control information from the memory controller. In some cases, the external memory controller or a controller on the memory die may determine the quantity of pins to use and/or the cycles for transmitting commands based on previously observed information, currently observed information, or predicted information, or a combination thereof.

In some cases, a specialized component is used to support the dynamic adaptation of the quantity of pins and/or cycles (which may also be referred to as the "C/A channel configuration") used to transmit control information. For example, a bus width configuration component may be included in an external memory controller. The bus width configuration component may be configured to determine a quantity of pins and/or cycles to use for subsequent transmissions of control information to a memory device—e.g., based on backward and/or forward-looking information. The bus width configuration component may be further configured to indicate to an encoder at the external memory controller the determined quantity of pins and/or cycles. For example, the bus width configuration component may be configured to signal a value corresponding to a particular quantity of pins to the encoder, and the encoder may generate a command based on the received value. The bus width configuration component may also indicate to a transmitter at the external memory controller the determined quantity of pins and/or cycles, and the transmitter may activate/deactivate particular drivers corresponding to particular pins at the external memory controller.

Similarly, a second bus width configuration component may be included in a memory device. The second bus width configuration component may be configured to store a quantity of pins and/or cycles to use for subsequent transmissions of control information to a memory device—e.g., based on backward and/or forward-looking information, a received configuration message, or receiving an indication of what pins have been disabled after a reset. The second bus width configuration component may be further configured to indicate to a decoder at the memory device the determined quantity of pins and/or cycles. For example, the second bus width configuration component may be configured to signal a value corresponding to a particular quantity of pins to the decoder, and the decoder may decode a received signal based on the received value. The second bus width configuration component may also indicate to a receiver at the memory device the determined quantity of pins and/or cycles, and the receiver may activate/deactivate particular drivers that are coupled with pins corresponding to particular pins at the memory device.

Features of the disclosure are described below in the context of a memory system in FIGS. 1 through 3. Features of the disclosure are described in the context of circuit diagrams, timing diagrams, and a process flow in FIGS. 4A through 7. These and other features of the disclosure are further illustrated by and described with reference to FIGS. 8 through 10, which include an apparatus diagram and flowcharts that relate to configuring a C/A channel.

FIG. 1 illustrates aspects of an exemplary system that utilizes one or more memory devices that support configuring a C/A channel as disclosed herein.

The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be a component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a graphics process unit (GPU), a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host device or host device. In some examples, system 100 may be a graphics card. The host device may include a plurality of drivers and a plurality of channels linking the host device with the memory device.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. An access command may, in some cases, be a command that prompts a memory device to store or read data from one or more memory cells. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be coupled with or in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a GPU, a general purpose graphic processing unit (GPGPU), or a system on a chip (SoC), among other examples.

In some cases, the processor 120 may be incorporated into or part of the external memory controller 105. In some cases, the processor 120 may be a GPU. The processor 120 may perform aspects of configuring bus transmission lines (e.g., data bus transmission lines) as described herein. For example, the processor 120 may divide a data bus into two sets of transmission lines: a first set to transfer control signals, and a second set to transfer data signals. If the quantity of data and control signals to be transferred changes, the processor 120 may reassign or reconfigure transmission lines from one set to another set to increase the efficiency and use of the bus.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components as would be understood by persons of ordinary skill in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input device 145 may represent a device or signal external to the system 100 that may provide information, signals, or data to the system 100 or its components. This may include a user interface or interface with or between other devices. In some cases, the input device 145 may be a peripheral that interfaces with system 100 via one or more peripheral components 130 or may be managed by the I/O controller 135.

The output device 150 may represent a device or signal external to the system 100 configured to receive an output from the system 100 or any of its components. Examples of the output device 150 may include a display, audio speakers, a printing device, or another processor on printed circuit board, etc. In some cases, the output device 150 may be a peripheral that interfaces with the system 100 via one or more peripheral components 130 or may be managed by the I/O controller 135.

The components of system 100 may be made up of general-purpose or special purpose circuitry designed to carry out their functions. This may include output driver circuitry and various other circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-*a*, local memory controller 165-*b*, and/or local memory controller 165-N) and a memory array 170 (e.g., memory array 170-*a*, memory array 170-*b*, and/or memory array 170-N). A memory array 170 may be a collection (e.g., a grid) of memory cells, with each memory cell being configured to store at least one bit of digital data. Features of memory arrays 170 and/or memory cells are further described with reference to FIG. 2.

The memory arrays 170 may be examples of two-dimensional (2D) arrays of memory cells or may be examples of a three-dimensional (3D) arrays of memory cells. For example, a 2D memory device may include a single memory die 160. A 3D memory device may include two or more memory dice 160 (e.g., memory die 160-*a*, memory die 160-*b*, and/or any quantity of memory dice 160-N). In a 3D memory device, multiple memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs, increase the performance of the memory array, or both. In some 3D memory devices, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may perform, or facilitate, aspects of configuring data bus transmission lines as described herein. For example, the device memory controller 155 may receive control and data signals over multiple different sets of transmissions lines that may be part of a data bus. When the two sets of transmission lines are reconfigured, the device memory controller 155 may receive control and/or data signals over the reconfigured transmission lines.

The device memory controller 155 may be configured to communicate with the external memory controller 105, the one or more memory dice 160, or the processor 120. In some cases, the memory device 110 may receive data and/or control signals (e.g., commands and addresses) from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, encoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, commands/and/or addresses between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal. The data clock signal may provide timing for multi-level signals sent over channels 115. For example, the data clock may provide timing information for determining the duration of symbol periods of a multi-level signal.

In some cases, the external memory controller 105 or other components of the system 100, or its functions described herein, may be implemented by the processor 120. For example, the external memory controller 105 may be hardware, firmware, or software, or some combination thereof implemented by the processor 120 or other component of the system 100. Although the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of a signal path of the channel 115.

Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170). A signal path may be implemented using one or more types of transmission lines, including differential transmission lines and single-ended transmission lines.

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (including sixteen signal paths), etc.

In some cases, the channels 115 may include one or more C/A channels 186. The C/A channels 186 may be configured to communicate commands between the external memory controller 105 and the memory device 110 including control information associated with the commands (e.g., address information). For example, the C/A channel 186 may include a read command with an address of the desired data. In some cases, the C/A channels 186 may be registered on a rising clock signal edge or a falling clock signal edge using a technique which may be referred to as single data rate (SDR) signaling, or to both rising and falling clock signal edges using a technique which may be referred to as double data rate (DDR) signaling. In some cases, a C/A channel 186 may include eight or nine signal paths.

In some cases, the channels 115 may include a row C/A channel and a column C/A channel. The row C/A channel may be configured to communicate row commands between the external memory controller 105 and the memory device 110, such as activation and precharge commands. The column C/A channel may be configured to communicate column commands between the external memory controller 105 and the memory device 110, such as a read and write commands. In some cases, the row C/A channel may be larger than the column C/A channel to accommodate larger row commands that convey more information than column commands. In such cases, the row C/A channel may be configured to include more pins and/or signal paths than the column C/A channel.

In some cases, the channels 115 may include one or more clock signal (CK) channels 188. The CK channels 188 may be configured to communicate one or more common clock signals between the external memory controller 105 and the memory device 110. Each clock signal may be configured to adjust (e.g., oscillate) between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. For example, the channels 115 may include data channels 190-1 through 190-n. Each data channel may be associated with or include one or more transmission lines. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., non-return-to-zero (NRZ) signaling, or pulse amplitude modulation (PAM) signaling).

In some cases, the channels 115 may include one or more other channels 192 that may be dedicated to other purposes. These other channels 192 may include any quantity of signal paths. In some cases, the other channels 192 may include one or more write clock signal (WCK) channels. Although the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK.

The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 (and their associated transmission lines) may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of an M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, NRZ, unipolar encoding, bipolar encoding, Manchester encoding, PAM having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary, modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal (e.g., a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Data and control information may be communicated within a system 100. For example, data and control information may be communicated between an external controller (e.g., an external memory controller 105) and a memory device (e.g., a memory device 110). Data may include information created by a user application and may be conveyed in data signaling.

Control information may include information that supports the flow of data within the system 100 and may be conveyed in control signaling. In some cases, the control information includes commands that direct the memory device to perform certain operations at a memory device. A memory operation may refer to an operation that manipulates one or more memory cells, access lines (e.g., word lines, digit lines, or plate lines), or memory banks. An access operation may refer to a subset of memory operations that involve or result in data being written to or read from a memory cell in memory device. Possible commands include precharge, row activation, read, and write commands.

The control information may also include a memory address (e.g., a row or column address) that identifies a particular memory cell or set of memory cells. As discussed herein, the address of one or more memory cells may be represented in a signal by a quantity of address bits indicating a block address, column address, and/or row address. For example, when memory device 310 includes sixteen (16) banks, and each of those banks includes one hundred and twenty-eight (128) columns and 16384 rows (e.g., as in a 16 Gb GDDR6 architecture or an 8 Gb GDDR5 architecture), the bank address may be represented by four address bits, the column address may be represented by seven address bits, and the row address may be represented by fourteen address bits. In some cases, a row of memory cells may be referred to as a memory page. In another example (e.g., in a 16 Gb DDR4×16 architecture), memory device 310 may include eight (8) banks, and each of those banks includes 1024 columns and 131072 rows, in which case the bank address may be represented by three address bits, the column address may be represented by ten address bits, and the row address may be represented by 17 address bits. However, these are illustrative examples and other quantities of address bits may be used and are specifically contemplated.

A control signal including both a command and a memory address may indicate that a command applies to a memory cell or set of memory cells identified by the address. In some cases, a control signal including both a command and a memory address is referred to as a C/A signal. In one example, a C/A signal including an activate (ACT) command and a row address may indicate to a memory device that a row of memory cells is to be activated in preparation for or in conjunction with another memory operation (e.g., a read or write operation). Activating a memory cell may refer to energizing the word line corresponding to that memory cell. When an ACT command is transferred to the memory device, the ACT command may include or be followed by a quantity of address bits that indicate the bank targeted for an upcoming read or write operation, as well as the row within that bank that is to be activated. Thus, a transmitted ACT command may include or be followed by the bank and row addresses relevant to the upcoming memory operation. When an ACT command includes a row address, the ACT command may be referred to as a row command. An external controller may transmit an ACT command each time a new row in a bank is targeted for a read or write operation. In some cases, when a rate of ACT commands decreases as a page hit rate increases—e.g., when there are consecutives requests to access a same row.

In an example of an access operation, a read command may indicate to a memory device that one or more memory cells are to undergo a read operation so that their stored information (e.g., as represented by logic states) can be transferred to an external controller. Reading a memory cell may refer to the process of applying a voltage across the memory cell so that the memory cell discharges onto a digit line for sensing. When a read command is transmitted to the memory device, the read command may include or be followed by the bank address and column address of the memory cell(s) targeted for the read operation. When a read command includes a column address, the read command may be referred to as a column command. In some cases, the read command may also indicate the quantity of memory cells that are to be read, starting at an initial address point. The quantity of memory cells to be read in response to a read command may be referred to as the read burst length.

In another example of an access operation, a write command may indicate to a memory device that one or more memory cells are to undergo a write operation so that information from an external controller can be stored in one of the memory banks of a memory device. Writing a memory cell may refer to the process of applying a voltage across the memory cell so that the memory cell charges to a state indicative of a logic one or zero. When a write command is transmitted to the memory device, the write command may include or be followed by the bank address and column address of the memory cell(s) targeted for the write operation. When a write command includes a column address, the write command may be referred to as a column command. In some cases, the write command may also indicate the quantity of memory cells that are to be written, starting at an initial address point. The quantity of memory cells to be written in response to a write command may be referred to as the write burst length.

To communicate data and/or control information within the system 100, data and control information may be signaled over one or more channels, such as channel 115, that electronically connect devices within the memory system. In some cases, each of the one or more channels may include multiple signal paths (or transmission paths). Devices may access the one or more channels via pins located at the devices, where the pins may act as a conductive interface between a device and a channel. For example, to communicate information between two devices, such as an external memory controller 105 and a memory device 110, the signal paths may be coupled with a first set of pins located at the external memory controller 105 and a second set of pins located at the memory device 110. In some cases, a grouping of signal paths and pins may be referred to as a "bus."

In some cases, to signal data and/or control information between two devices, a first device may apply an internally generated signal to a first set of pins located at the first device. In some cases, the internally generated signal is composed of one or more voltages (e.g., multiple parallel and/or series voltages) and the first set of pins may be coupled with a set of signal paths of a channel that connects the two devices. In some examples, an external memory controller 105 may signal data and/or control information to a memory device 110 by applying one or more voltages of a signal to a first set of pins at the external memory controller 105 that are coupled with a channel 115 connecting the external memory controller 105 and the memory device 110. In some cases, all of the one or more voltages are applied at a same time within a single time period. In other cases, subsets of the one or more voltage are sequentially applied across multiple time periods. The memory device 110 may receive the one or more voltages of the signal at a second set of pins located at the memory device 110 and may decode the signal to determine the signaled data and/or control information. Similarly, the memory device 110 may signal data to the external memory controller 105 by applying one or more voltages to the second set of pins.

In some cases, data and control information may be signaled over separate data and control channels that electronically connect devices within the memory system via pins located at the device. For example, data may be signaled over a channel (e.g., a DQ channel 190) that is dedicated to data (a "data channel") and control information may be signaled over a channel (e.g., a C/A channel 186) that is dedicated to control information (a "control channel"). When data and control information is signaled over separate channels, a first set of signal paths of a data channel may be coupled with a first set of pins located at a first device and a first set of pins located at a second device. And a second set of signal paths of a control channel may be coupled with a second set of pins located at the first device and a second set of pins located at the second device. In some cases, when separate channels are used to signal data and control information, control information and data may be signaled according to a timing or protocol that indicates which control information corresponds to which data.

In some cases, a quantity of pins and a quantity of signal paths used to signal control information may be based on the quantity of information bits used to convey a largest type of control information (e.g., the largest C/A combination) and/or a quantity of cycles used to transmit the different types of control information. In some cases, the quantity of pins and signal paths may be the same. In some examples, the quantity of pins and signal paths (or the size of a bus) used to signal control information may be reduced by decreasing a size of the largest type of control information (e.g., by encoding control information). In some examples, the quantity of pins and signal paths (or the size of a bus) used to signal control information may be reduced by increasing the quantity of cycles used to transmit the largest type of control information, or vice versa.

In some cases, commands are signaled over a control channel in a serial fashion. That is, a first command may be sent, then a second command may be sent, then a third command, and so on. However, in some cases, a memory device may capable of performing operations triggered by different commands in parallel—e.g., a memory device may perform a read operation for memory cells located at a first column address in a first memory bank at a same time as performing a row activation operation for memory cells located in a different memory bank. By processing two commands in parallel, a throughput of a memory device may be increased.

In some cases, multiple control channels may be used to communicate parallel streams of control information. For example, a first channel may be used to communicate row commands (a "row control channel") and a second channel may be used to communicate column commands (a "column control channel"). In such cases, the quantity of pins used to transmit row control information may be based on the size of the largest type of row control information (e.g., the largest row C/A combination) and/or a quantity of cycles used to transmit the different types of row control information. And the quantity of pins used to transmit column control information may be based on the size of the largest type of column control information (e.g., the largest column C/A combination) and/or a quantity of cycles for transmitting the different types of row control information.

As the quantity of pins used to signal control information increases, the size (or footprint) of a memory die and/or the power consumption of a memory die may also increase. In some cases, to reduce the size and power consumption of a memory die, the quantity of pins used to signal control information may be decreased and the quantity of cycles used to transmit control information may be increased. But increasing the quantity of cycles used to transmit control information may cause a delay in the execution of commands. That is, by increasing the quantity of cycles used to transmit control information, the transmission of discrete control information may take longer, delaying the transmission of subsequent control information.

To reduce power consumption at a memory die without introducing latency into the execution of consecutive commands, the quantity of pins and/or cycles used to communicate control information may be dynamically adapted.

In some cases, the quantity of pins and/or cycles used to communicate control information is adapted based on previously observed information. For example, an external memory controller (e.g., an external memory controller 105) may activate additional pins after identifying that a quantity of control information waiting to be sent (e.g., in a queue) has exceeded a threshold. After or concurrently with activating the additional pins, the external memory controller may also reduce a quantity of cycles used to transmit control information. By reducing the amount of time for transmitting individual pieces of control information, a backlog of control information in a queue may be reduced. Similarly, the external memory controller may deactivate certain pins after identifying that a quantity of control information waiting to be sent is below a threshold.

In some cases, the quantity of pins and/or cycles used to communicate control information is adapted based on predicted information. For example, an external memory controller (e.g., an external memory controller 105) may deactivate a quantity of pins after identifying that a page hit rate for the memory device exceeds a threshold value. A page hit rate may be associated with a quantity of times a row of memory cells in a memory bank is accessed before another row of memory cells in the memory bank is accessed. Higher page hit rates may correspond to a pattern of commands that has a decreased rate of activation commands, which are often longer commands.

In some cases, a specialized component is used to support the dynamic adaptation of the quantity of pins and/or cycles used to transmit control information. For example, a bus width configuration component may be implemented using at least portions of one or more memory controllers (e.g., external memory controller 105, device memory controller 155, local memory controllers 165 or 260, or a combination thereof) and/or a register. The bus width configuration component may be configured to determine a quantity of pins and/or cycles to use for subsequent transmissions of control information to a memory device—e.g., based on backward and/or forward-looking information. The bus width configuration component may be further configured to indicate to an encoder at the external memory controller the determined quantity of pins and/or cycles. For example, the bus width configuration component may be configured to signal a value corresponding to a particular quantity of pins to the encoder, and the encoder may generate a command based on the received value. The bus width configuration component may also indicate to a transmitter at the external memory controller the determined quantity of pins and/or cycles, and the transmitter may activate/deactivate particular drivers corresponding to particular pins at the external memory controller.

Similarly, a second bus width configuration component may be included in a memory device. The second bus width configuration component may be configured to determine a quantity of pins and/or cycles to use for subsequent transmissions of control information to a memory device—e.g., based on backward and/or forward-looking information, a received configuration message, or determining which pins have been disabled. The second bus width configuration component may be further configured to indicate to a decoder at the memory device the determined quantity of pins and/or cycles. For example, the second bus width configuration component may be configured to signal a value corresponding to a particular quantity of pins to the decoder, and the decoder may decode a received signal based on the received value. The second bus width configuration component may also indicate to a receiver at the memory device the determined quantity of pins and/or cycles, and the receiver may activate/deactivate particular circuits that are coupled with pins corresponding to particular pins at the memory device.

Figure 2:
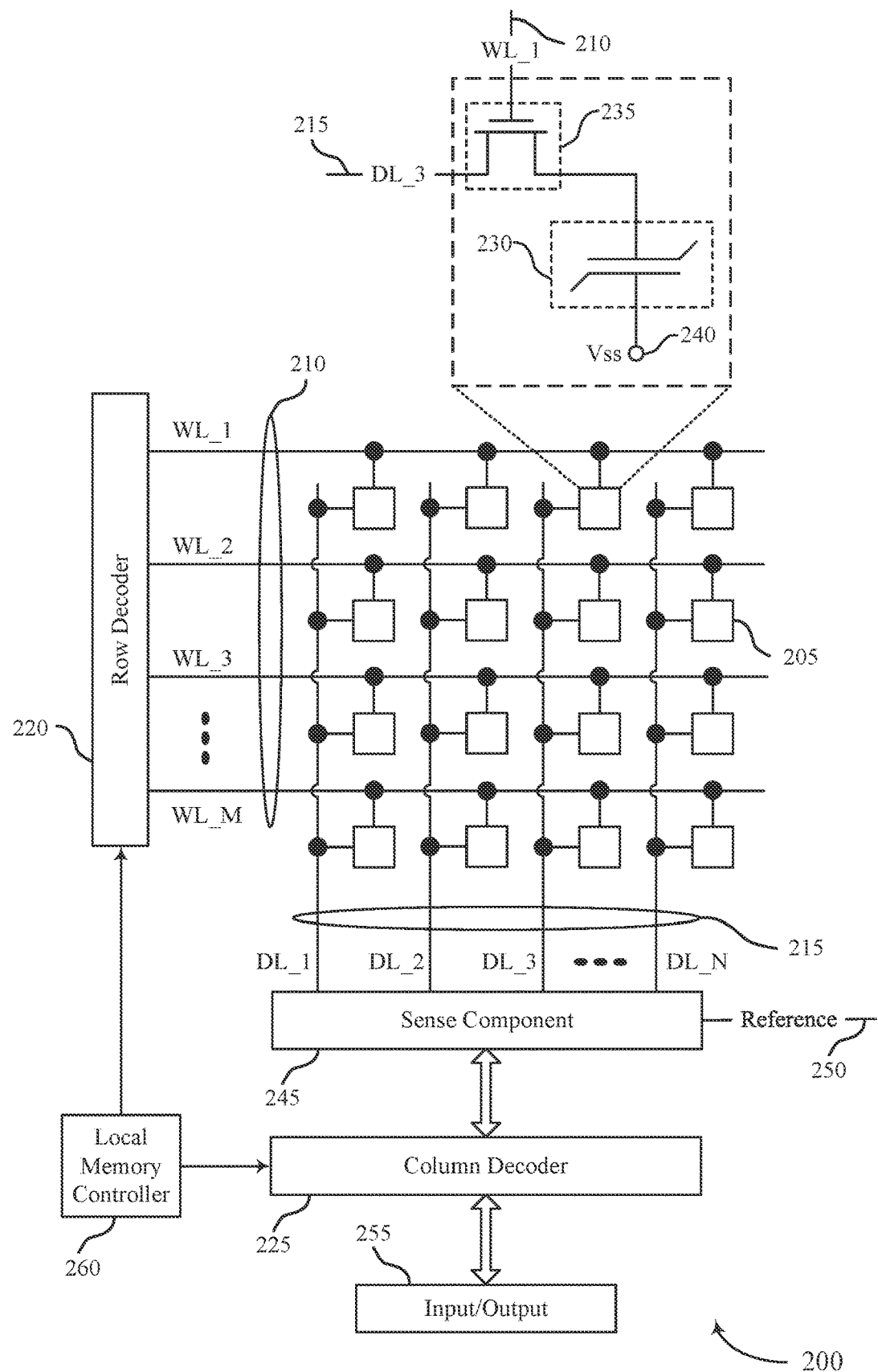
FIG. 2 illustrates aspects of an exemplary memory device that supports configuring a C/A channel as disclosed herein.

FIG. 2 illustrates aspects of an exemplary memory device that supports configuring a C/A channel as disclosed herein. The memory device 200 may be an example of the memory dice 160 described with reference to FIG. 1. In some cases, the memory device 200 may be referred to as a memory chip, a memory device, or an electronic memory apparatus. The memory device 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. In dynamic random access memory (DRAM) architectures, a memory cell, such as memory cell 205, may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines, References to access lines, word lines and digit lines, or their analogues, are interchangeable without loss of understanding or operation. Activating or selecting a word line 210 or a digit line 215 may include applying a voltage to the respective line.

The memory device 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection. The memory device 200 may include a quantity of memory banks, at least some of which, if not each of which, may have a unique address and which may include a multitude of rows and columns.

Accessing the memory cells 205 in a memory bank may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory device 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 is a ground such as Vss. In some cases, the voltage source 240 may be an example of a plate line coupled with a plate line driver. The switching component 235 may be an example of a transistor or any other type of switch device that selectively establishes or de-establishes (e.g., ceases) electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 may be or include a transistor and its operation may be controlled by applying a voltage to the transistor gate, where the voltage differential between the transistor gate and transistor source may be greater or less than a threshold voltage of the transistor. In some cases, the switching component 235 may be or include a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that may be used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge.

During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0.

The sense component 245 may include various transistors or amplifiers to detect and amplify a difference in the signals. In some cases, the sense component 245 may be part of another component (e.g., a column decoder 225, row decoder 220). In some cases, the sense component 245 may be in electronic communication with the row decoder 220 or the column decoder 225.

The detected logic states of memory cells 205, as determined by the sense component 245 as one example, may be output through column decoder 225 as output 255. Output 255 may pass the detected logic states to one or more intermediary components (e.g., a local memory controller) for transfer over one or more channels (e.g., for transmission over one or more transmission lines). Thus, the detected logic state of memory cells 205 may be conveyed to devices or components external to memory device 200. For example, the detected logic states may be transferred (e.g., to an external memory controller 105) via one or more transmission lines.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory device 200, perform one or more operations on the memory device 200, and communicate data from the memory device 200 to the external memory controller 105 (or the device memory controller 155) in response to performing the one or more operations. In some cases, the local memory controller 260 may be configured to receive data and control information over different channels. In some cases, local memory controller 260 may be configured to receive different types of commands over different channels. For example, the local memory controller 260 may be configured to receive row commands over a first command channel and column commands over a second command channel.

As also discussed herein, the memory device 200 may receive commands of varying durations over a variable quantity of pins. In some cases, the local memory controller 260 may determine a quantity of pins for receiving one or more commands. For example, the local memory controller 260 may determine the quantity of pins used to signal the one or more commands based on determining that a second quantity of pins used for command transmissions are set to a particular voltage. In another example, the local memory controller 260 may determine the quantity of pins used to signal the one or more commands based on receiving an indication of which or how many pins are to be used. Additionally or alternatively, the local memory controller 260 may determine a quantity of cycles for receiving the one or more commands. In some cases, the local memory controller 260 may determine the quantity of cycles for receiving the one or more commands based on determining the quantity of pins used to transmit the one or inure commands. For instance, the local memory controller 260 may be configured to determine that a particular command (e.g., a row activation command) spans a certain quantity of cycles (e.g., 2) based on first determining that the particular command was transmitted over six (6) pins. After determining the quantity of pins and/or the quantity of cycles, the local memory controller 260 may configure a receiver and/or decoder to receive and process commands accordingly.

The memory device 200 may send data to and receive data from one or more external devices via a bus (e.g., a data bus) that includes multiple transmission lines. As described herein, the memory device 200 may use different combinations of the transmission lines to transfer control signals and data signals. The memory device 200 may modify the combinations of transmission lines (e.g., based on a quantity of content to be transferred) so that some transmission lines previously used or previously configured to transfer data may be used or configured to transfer control signals, and vice versa. The quantity of transmission lines selected to transfer a type of content (e.g., control content or data content) may be related to (e.g., proportional to) the quantity of content.

The local memory controller 260 may generate row and column address signals to activate the target word line 210 and the target digit line 215. The local memory controller 260 may also generate and control various voltages or currents used during the operation of the memory device 200. In general, the amplitude, shape, or duration of an applied voltage or current discussed herein may be adjusted or varied and may be different for the various operations discussed in operating the memory device 200.

In some cases, the local memory controller 260 may be configured to perform a write operation (e.g., a programming operation) on one or more memory cells 205 of the memory device 200. The write operation may be for data received from an external device. During a write operation, a memory cell 205 of the memory device 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a first signal (e.g., voltage) to the digit line 215 during the write operation to store a first state (e.g., charge) in the capacitor 230 of the memory cell 205, and the first state (e.g., charge) may be indicative of a desired logic state.

In some cases, the local memory controller 260 may be configured to perform a read operation (e.g., a sense operation) on one or more memory cells 205 of the memory device 200. The read operation may be for data requested by, or intended for, an external device. During a read operation, the logic state stored in a memory cell 205 of the memory device 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205.

The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
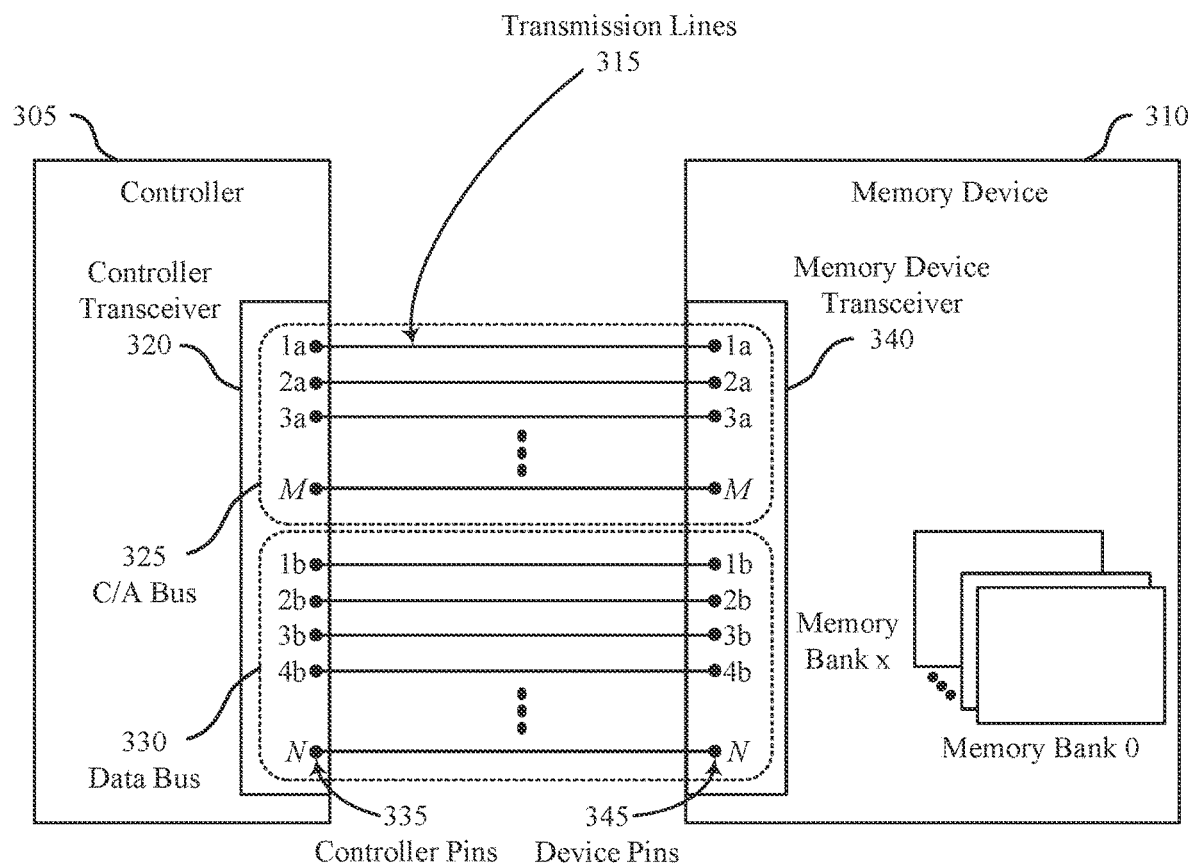
FIG. 3 illustrates aspects of an exemplary system that supports configuring a C/A channel as disclosed herein.

FIG. 3 illustrates aspects of an exemplary system that supports configuring a C/A channel in accordance with various aspects of the present disclosure.

System 300 may be an example of a system 100 described with reference to FIG. 1. System 300 may include controller 305, memory device 310, and transmission lines 315. In some cases, controller 305 may be an example of an external memory controller 105 (also referred to as a host device, host device controller, or host device) or a processor 120 (e.g., a GPU, a GPGPU, a CPU), as described with reference to FIG. 1. In some cases, memory device 310 may be an example of a memory device 110, memory die 160, device memory controller 155, local memory controller 165, or memory device 200, as described with reference to FIGS. 1 and 2.

Controller 305 may be configured to determine a quantity of pins and/or a quantity of cycles for transmitting one or more commands to a memory device, such as memory device 310. Controller 305 may include controller transceiver 320.

Controller transceiver 320 may be configured to transmit command, address, and data signaling to other devices, such as memory device 310. In some cases, controller transceiver 320 may transmit C/A signaling based on the quantity of pins and cycles for transmitting the command determined by controller 305. In some cases, controller transceiver 320 uses multi-level signaling techniques, such PAM4 signaling, and/or other signaling techniques to increase a communication rate, such as DDR signaling—when DDR signaling is used, first information may be signaled at a rising edge of a clock pulse and second information may signaled at a falling edge of the clock pulse. Controller transceiver 320 may include and/or be in electronic communication with controller pins 335.

Controller pins 335 may be configured to provide an interface between the transmitting and receiving components of controller 305 and transmission lines 315. In some cases, pins located at controller 305 (e.g., controller pin 1a ("CP_1a")) may correspond to pins located at memory device 310 (e.g., memory device pin 1a ("MDP_1a")). In some cases, controller pins 335 may be referred to as nodes, pads, terminals, transmission line interfaces, interface components, or connection points). In some cases, the controller pins 335 may be made of a conductive material that is capable of transferring current or voltage to and from the transmission lines 315 and controller 305.

Controller transceiver 320 may transmit command, address, and data signaling using controller pins 335. That is, controller transceiver 320 may apply aspects of a signal to controller pins 335 to transmit the signal to memory device 310. In some cases, controller transceiver 320 transmits command, address, and data signaling over different busses. For example, controller transceiver 320 may transmit C/A signaling over the controller pins 335 included in C/A bus 325 and may transmit data signaling over the controller pins 335 included in data bus 330. In some cases, the C/A signaling transmitted over C/A bus 325 includes information that enables memory device 310 to process corresponding data signaling received over data bus 330. For example, C/A signaling transmitted over C/A bus 325 may indicate that information included in corresponding data signaling transmitted over data bus 330 is to be stored at (e.g., if a write command is signaled) or read from (e.g., if a read command is signaled) particular memory cell(s). In some cases, controller transceiver 320 may include an encoder that is configured to generate a set of information bits for a particular command. In some cases, controller transceiver 320 may be configured to receive command, address, and/or data signaling from other devices, such as memory device 310.

Memory device 310 may store information in the memory cells of one or more memory banks (e.g., in memory banks 0 through x). The memory cells may be arranged in the memory banks in sets of rows and columns as described with reference to FIG. 2. Partitioning the memory array into one or more banks allows some level of parallelism in accessing the memory array, which may increase the overall bandwidth of the memory device. Thus, to target a particular memory cell for a memory operation, memory device 310 may need to identify or be directed to the bank, column, and row of the memory cell at issue. The bank, column, and row associated with the memory cell may be indicated or represented by addresses. For example, the bank that includes the memory cell may be associated with a bank address, the column that includes the memory cell may be associated with a column address, and the row that includes the memory cell may be indicated by the row address. Memory device 310 may be configured to determine a quantity of pins and a quantity of cycles for receiving one or more commands from a host device, such as controller 305. Memory device 310 may include a memory device transceiver 340.

Memory device transceiver 340 may be configured to receive command, address, and data signaling from another device, such as controller 305. In some cases, memory device transceiver 340 may receive C/A signaling based on the quantity of pins and cycles determined by memory device 310. In some cases, memory device transceiver 340 may be configured to receive signaling according to a particular modulation scheme (e.g., NRZ, PAM2, or PAM4) and/or using single data rate (SDR) or DDR techniques. Memory device transceiver 340 may include and/or be in electronic communication with device pins 345. In some cases, memory device transceiver 340 may be configured to transmit command, address, and/or data signaling to other devices, such as controller 305. In some cases, C/A bus 325 may be configured to support transmissions of command and address information to memory device 310 from controller 305, but not to support transmissions of command and address information to controller 305 from memory device 310 (e.g., C/A bus 325 may be unidirectional). In other cases, C/A bus 325 may support bidirectional communications between controller 305 and memory device 310.

Device pins 345 may be configured to provide an interface between the transmitting and receiving components of memory device 310 and transmission lines 315. In some cases, pins located at memory device 310 (e.g., device pin 1a ("MDP_1a")) may correspond to pins located at controller 305 (e.g., controller pin 1a ("CP_1a")). In some cases, device pins 345 may be referred to as nodes, pads, terminals, transmission line interfaces, interface components, or connection points). In some cases, the device pins 345 may be made of a conductive material that is capable of transferring current or voltage to and from the transmission lines 315 and memory device 310.

Memory device transceiver 340 may receive command, address, and data signaling using device pins 345. That is, memory device transceiver 340 may receive aspects of a signal over device pins 345 and may combine the aspects of the signal to reconstruct the transmitted signal. For example, memory device transceiver 340 may receive C/A signaling over the device pins 345 included in C/A bus 325 and data signaling over the device pins 345 included in data bus 330. In some cases, the C/A signaling received over C/A bus 325 provides information for receiving corresponding data signaling over data bus 330. For example, C/A signaling received over C/A bus 325 may direct the memory device 310 to store (e.g., if a write command is received) information included in a corresponding data signaling received over data bus 330 at particular memory cell(s)—e.g., based on the address received in the C/A signaling. In another example, C/A signaling received over C/A bus 325 may direct the memory device 310 to read data from (e.g., if a read command is signaled) particular memory cell(s)—e.g., based on the command and address received in the C/A signaling. In some cases, memory device transceiver 340 may include a decoder that is configured to identify a particular command corresponding to a command, address, or data signal received over device pins 345.

Transmission lines 315 may be configured to electronically connect controller 305 and memory device 310. As shown in system 300, transmission lines 315 may originate at one component (e.g., controller 305) and terminate at another component (e.g., memory device 310) which may or may not be within the same device. Transmission lines 315 may be conductive wires or traces. In some cases, transmission lines 315 provide a one-to-one mapping between controller pins 335 and device pins 345. In some cases, transmission lines 315 are included in a channel, such as a channel 115 as described with reference to FIG. 1. For example, transmission lines 1a through M may be included in a control channel, such as C/A channel 185) and transmission lines 1b to N may be included in a data channel, such as DQ channel 190-1.

C/A bus 325 may be configured to communicate C/A signaling between controller 305 and memory device 310. In some cases, C/A bus 325 includes a subset of controller pins 335 (e.g., CP_1a to CP_M), a subset of device pins 345 (e.g., MDP_1a to MDP_M), and a subset of transmission lines 315 (e.g., TL_1a to TL_M). In other cases, C/A bus 325 is defined to include the subset of transmission lines 315 and is equivalent to a channel, such as a channel 115 as described with reference to FIG. 1. In some cases, C/A bus 325 is further partitioned into a row C/A bus and a column C/A bus. The row C/A bus may be configured to communicate row commands and row addresses to memory device 310 and the column C/A bus may be configured to communicate column commands and column addresses to memory device 310. In some examples, more bits of information are used to convey row commands than column commands—e.g., when a memory array is configured so that there are more rows than columns—and the row C/A bus may include more pins than the column C/A bus.

Data bus 330 may be configured to communicate data signaling between controller 305 and memory device 310. In some cases, data bus 330 includes a subset of controller pins 335 (e.g., CP_1b to CP_N), a subset of device pins 345 (e.g., MDP_1b to MDP_N), and a subset of transmission lines 315 (e.g., TL_1b to TL_N). In some cases, data signals communicated over data bus 330 correspond to C/A signals transmitted over C/A bus 325—e.g., instructions for processing data information conveyed in a data signal may be included in a prior C/A signal.

In some cases, a configuration of C/A bus 325 may be dynamically configured—e.g., based on past, current, or predicted operation, or combinations thereof of the system 300. For example, controller 305 may disable particular controller pins 335 based on determining that a rate of ACT command transmissions is below a threshold. In another example, controller 305 may enable additional controller pins 335 based on identifying that a quantity of commands in a command queue has exceeded a threshold. In another example, controller 305 may enable additional controller pins 335 based on predicting that a rate of ACT command transmissions will increase. By dynamically adapting a configuration of C/A bus 325, controller 305 may conserve power without sacrificing the timely execution of commands. In some examples, controller 305 indicates to memory device 310 a configuration of C/A bus 325. For example, controller 305 may transmit a bus width configuration message to memory device 310 indicating which transmission lines 315 of C/A bus 325 are being used to convey information.

Memory device 310 may receive control information over the dynamically adapted C/A bus 325. In some cases, memory device 310 determines a configuration of C/A bus 325 based on a signal transmitted over C/A bus 325 based on either an implicit or explicit message. For example, based on identifying that a voltage on certain transmission lines 315 is set to a high or low voltage. In other cases, memory device may determine a configuration of C/A bus 325 based on a message received from controller 305, as discussed herein. For example, memory device 310 may receive the configuration message and disable the device pins 345 based on the indicated configuration of C/A bus 325—e.g., memory device 310 may determine that transmission lines 3a to M are disabled based on the bus width configuration message and may disable device pins 3a to M. By disabling the device pins 345, memory device 310 may conserve power.

In some cases, a quantity of cycles used to communicate C/A information is also configured based on a configuration of C/A bus 325. That is, as the quantity of pins used to communicate C/A information is adapted, a quantity of cycles used to communicate C/A information over the pins may be increased or decreased. For example, if controller 305 decreases the quantity of pins used to transmit C/A information, then a quantity of cycles used to transmit C/A information may be increased—e.g., so that the full command may be transmitted—as discussed in more detail herein and with respect to FIGS. 6A through 6C. The quantity of cycles used to receive C/A information at memory device 310 may be similarly adapted at memory device 310 as the configuration of C/A bus 325 is adapted.

In some cases, instead of disabling pins dedicated to C/A bus 325, the unused controller and device pins dedicated to C/A bus 325 may be repurposed for communicating data information and included in data bus 330. By reassigning pins dedicated to C/A bus 325 to be used for data bus 330, the rate of data transfer between memory device 310 and controller 305 may be increased.

Figure 4A:
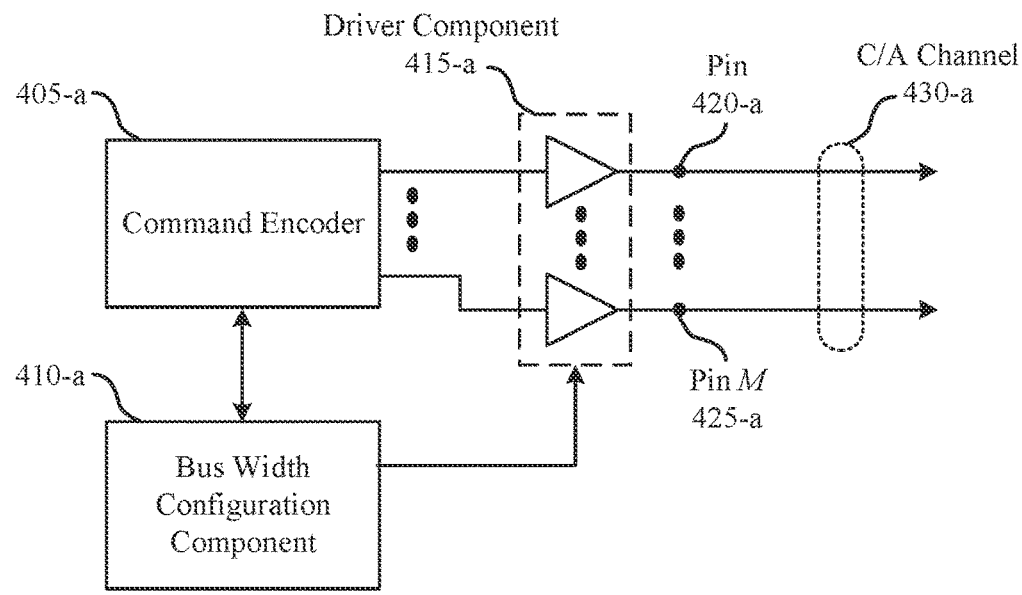
FIGS. 4A and 4B illustrate aspects of exemplary host devices that support configuring a C/A channel as disclosed herein.

FIG. 4A illustrates aspects of an exemplary host device that supports configuring a C/A channel in accordance with various aspects of the present disclosure.

Host device 400-a may be configured to dynamically configure aspects of a C/A channel for communicating control and address information with other devices. Host device 400-a may also be configured to dynamically configure aspects of a data channel for communicating data with other devices. In some cases, host device 400-a may be an example of an external memory controller 105 or controller 305, as described with reference to FIGS. 1 and 3. Host device 400-a may include command encoder 405-a, bus width configuration component 410-a, driver component 415-a, first pin 420-a and Mth pin 425-a. Host device 400-a may be coupled with and communicate with a memory device (e.g., device controller 500-a as described with reference to FIG. 5A) over C/A channel 430-a, which may be an example of a channel 115, as described with reference to FIG. 1.

In some cases, a transmitter, such as controller transceiver 320 or memory device transceiver 340 as described with reference to FIG. 3, may include any one of command encoder 405-a, bus width configuration component 410-a, driver component 415-a, and first pin 420-a to Mth pin 425-a, or any combination thereof.

Command encoder 405-a may be configured to generate an encoded set of information bits for a received command and memory address according to a configured modulation and encoding scheme. For example, if command encoder 405-a receives a signal representative of a row activation command and a row address, command encoder 405-a may generate one (1) command bit, four (4) bank address bits, and sixteen (16) row address bits—21 total bits. In another example, if command encoder 405-a receives a signal representative of a read command and a column address, command encoder 405-a may generate three (3) command bits, four (4) bank address bits, and six (6) column address bits—13 total bits. Command encoder 405-a may signal an encoded set of information bits to driver component 415-a.

In some cases, command encoder 405-*a* may be further configured to generate the encoded set of bits based on a configured bus width. That is, command encoder 405-*a* may be configured to encode a command and memory address based on a quantity of enabled drivers/pins located at host device 400-*a*. For example, if command encoder 405-*a* receives a signal representative of a row activation command and a row address, eleven (11) pins are enabled, and a binary modulation scheme and double data rate signaling is used, command encoder 405-*a* may generate and signal eleven (11) of the 21 information bits before a rising edge of a first signaling period and the remaining ten (10) of the 21 information bits before a falling edge of the first signaling period. In another example, if command encoder 405-*a* receives a signal representative of a row activation command and a row address, six (6) pins are enabled, and a binary modulation scheme and double data rate signaling is used, command encoder 405-*a* may generate and signal the beginning six (6) of the 21 information bits before a rising edge of a first signaling period, the next six (6) of the 21 information bits before a falling edge of the first signaling period, the following six (6) of the 21 information bits before a rising edge of a second signaling period, and the last three (3) of the 21 information bits before a falling edge of the second signaling period.

Bus width configuration component 410-*a* may be configured to dynamically determine a quantity of pins and/or cycles to use for transmitting a C/A signal over C/A channel 430-*a*. For example, bus width configuration component 410-*a* may determine a quantity of pins and/or cycles to use for transmitting a command based on a quantity of commands waiting in a queue to be transmitted from host device 400-*a*—e.g., bus width configuration component 410-*a* may determine that an increased quantity of pins (e.g., all available pins) and a decreased quantity of cycles (e.g., one (1) cycle) should be used to transmit commands if the quantity of commands in the queue exceeds a threshold value. In another example, bus width configuration component 410-*a* may determine a quantity of pins and/or cycles to use for transmitting command based on the type of commands waiting in a queue to be transmitted from host device 400-*a*—e.g., bus width configuration component 410-*a* may determine that an increased quantity of pins (e.g., all available pins) and a decreased quantity of cycles (e.g., one (1) cycle) should be used to transmit commands if a quantity of row commands included in the queue exceeds a threshold value. In another example, bus width configuration component 410-*a* may determine a quantity of pins and/or cycles to use for transmitting command based on an expected or predicted hit rate for a memory bank—e.g., bus width configuration component 410-*a* may determine that a decreased quantity of pins (e.g., six (6) pins) and an increased quantity of cycles (e.g., two (2) cycle) if a predicted hit rate is greater than or equal to two.

Bus width configuration component 410-*a* may be further configured to store a value corresponding to the determined quantity of pins and/or cycles for transmitting the C/A signal. In some cases, bus width configuration component 410-*a* stores the value in a bus width configuration register that is included within or external to bus width configuration component 410-*a*. For example, bus width configuration component 410-*a* may store a first value (e.g., "00") corresponding to a first quantity of enabled pins (e.g., eleven (11) pins) and a first quantity of cycles (e.g., one (1) cycle), a second value (e.g., "01") corresponding a second quantity of enabled pins (e.g., six (6) pins) and/or a second quantity of cycles (e.g., two (2) cycles), and so on. In some cases, aspects of bus width configuration component 410-*a* are implemented in different areas of host device 400-*a*. For example, a component of bus width configuration component 410-*a* used to determine the quantity of pins and/or cycles may be located in a processing portion of host device 400-*a* and the bus width configuration register may be located elsewhere (e.g., within a transceiver). In some cases, a bus width configuration component 410-*a* may be implemented using at least portions of one or more memory controllers (e.g., external memory controller 105, device memory controller 155, local memory controllers 165 or 260, or a combination thereof) and/or a register. Also, the bus width configuration register may be in direct electronic communication with command encoder 405-*a* and driver component 415-*a*, while a component of bus width configuration component 410-*a* used to determine the quantity of pins and/or cycles may be in indirect electronic communication with command encoder 405-*a* and driver component 415-*a*.

Bus width configuration component 410-*a* may be further configured to program an encoding scheme of command encoder 405-*a* by causing the bus width configuration register indicating the stored value to command encoder 405-*a*. For example, bus width configuration component 410-*a* may indicate to command encoder 405-*a* a value stored in the bus width configuration register that corresponds to a pin configuration, and command encoder 405-*a* may use an encoding scheme corresponding to the indicated value/pin configuration. In some cases, command encoder 405-*a* may generate a bus width configuration command based on receiving an indication of the bus width from bus width configuration component 410-*a* and transmit the bus width configuration command over C/A channel 430-*a*.

Bus width configuration component 410-*a* may be further configured to activate/deactivate one or more drivers of driver component 415-*a* by indicating the value stored in the bus width configuration register to driver component 415-*a*. For example, bus width configuration component 410-*a* may indicate to driver component 415-*a* a value stored in the bus width configuration register that corresponds to a pin configuration, and driver component 415-*a* may enable/disable one or more drivers corresponding to the indicated value and/or pin configuration.

Driver component 415-*a* may be configured to generate a signal based on a received set of information bits. In some cases, driver component 415-*a* generates a signal based on an encoded set of information bits received from command encoder 405-*a*. In some examples, driver component 415-*a* may be configured to generate a signal according to a configured modulation scheme (e.g., NRZ, PAM2, or PAM4) and/or signaling scheme (e.g., SDR or DDR signaling). Driver component 415-*a* may be in electronic communication with first pin 420-*a* to Mth pin 425-*a*.

First pin 420-*a* to Mth pin 425-*a* may be configured to provide a signaling interface between host device 400-*a* and C/A channel 430-*a*. In some cases, the quantity of pins (M) included in host device 400-*a* is selected to accommodate the transmission of the largest C/A combination within a single cycle. For example, if 21 bits are used to convey the largest C/A combination and a binary modulation scheme and double data rate signaling are used, then M may be equal to eleven (11) pins.

Figure 4B:
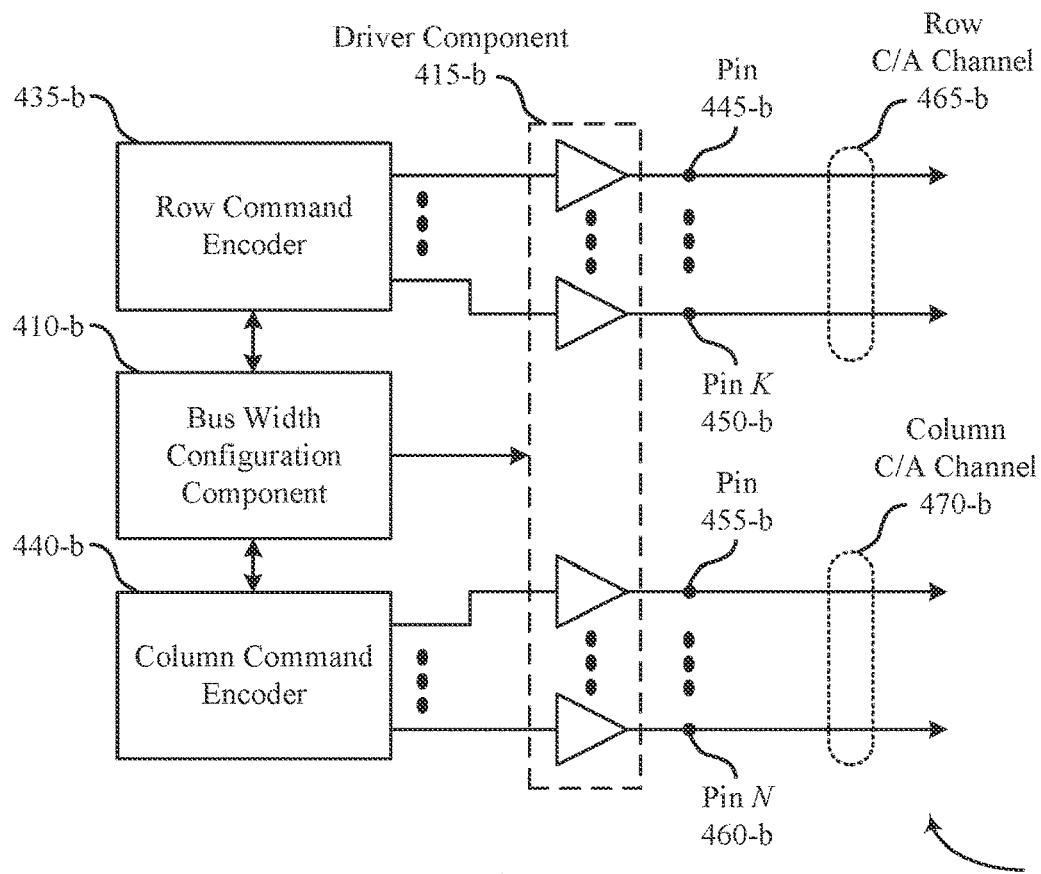

FIG. 4B illustrates aspects of an exemplary host device that supports configuring a C/A channel in accordance with various aspects of the present disclosure.

Host device 400-*b* may be an example of host device 400-*a*, as described with reference to FIG. 4A. Host device 400-*b* may include bus width configuration component 410-*b* and driver component 415-*b*, which may be examples of bus width configuration component 410-*a* and driver component 415-*a*, as described with reference to FIG. 4A. Host device 400-*b* may also include row command encoder 435-*b*, column command encoder 440-*b*, first pin 445-*b*, Kth pin 450-*b*, second pin 455-*b*, and Nth pin 460-*b*. Host device 400-*b* may be coupled with and communicate over row C/A channel 465-*b* and column C/A channel 470-*b*, which may examples of channels 115, as described with reference to FIG. 1.

In some cases, a transmitter, such as controller transceiver 320 as described with reference to FIG. 3, may include any one of bus width configuration component 410-*b*, driver component 415-*b*, row command encoder 435-*b*, column command encoder 440-*b*, first pin 445-*b* to Kth pin 450-*b*, and second pin 455-*b* to Nth pin 460-*b*, or any combination thereof.

Row command encoder 435-*b* may be configured to generate an encoded set of information bits for a received row command and row address according to a configured encoding scheme. For example, if row command encoder 435-*b* receives a signal representative of a row activation command and a row address, row command encoder 435-*b* may generate one (1) command bit, four (4) bank address bits, and sixteen (16) row address bits—21 total bits. Row command encoder 435-*b* may signal an encoded set of information bits to driver component 415-*b*. In some cases, row command encoder 435-*b* may be further configured to generate the encoded set of bits based on a configured row bus width, similar to command encoder 405-*a* as described with reference to FIG. 4A. In some cases, the grouping of row C/A channel 465-*b* and first pin 445-*b* to Kth pin 450-*b* may be referred to as a row bus.

Column command encoder 440-*b* may be configured to generate an encoded set of information bits for a received column command and column address according to a configured encoding scheme. For example, if column command encoder 440-*b* receives a signal representative of a read command and a column address, column command encoder 440-*b* may generate three (3) command bits, four (4) bank address bits, and six (6) column address bits—13 total bits. Column command encoder 440-*b* signal an encoded set of information bits to driver component 415-*b*. In some cases, column command encoder 440-*b* may be further configured to generate the encoded set of bits based on a configured column bus width, similar to command encoder 405-*a* as described with reference to FIG. 4A. In some cases, the grouping of column C/A channel 470-*b* and second pin 455-*b* to Nth pin 460-*b* may be referred to as a column bus.

Bus width configuration component 410-*b* may be configured to dynamically determine a quantity of pins and/or cycles to use for transmitting a row C/A signal over row C/A channel 465-*b*. For example, bus width configuration component 410-*b* may determine a quantity of pins and/or cycles to use for transmitting a row command based on a quantity of row commands waiting to be transmitted, a type of row commands waiting to be transmitted, and/or based on a predicted page hit rate. Bus width configuration component 410-*b* may be similarly configured to dynamically determine a quantity of pins and/or cycles to use for transmitting a column C/A signal over column C/A channel 470-*b*.

Bus width configuration component 410-*b* may be further configured to store one or more values corresponding to the determined quantity of pins and/or cycles for transmitting over row C/A channel 465-*b* and column C/A channel 470-*b*—e.g., in a bus width configuration register that is included within or external to bus width configuration component 410-*b*.

Bus width configuration component 410-*b* may indicate, or cause the bus width configuration register to indicate, the one or more stored values to row command encoder 435-*b* and column command encoder 440-*b*, and row command encoder 435-*b* and column command encoder 440-*b* may encode commands based on the received value. Bus width configuration component 410-*b* may indicate, or cause the bus width configuration register to indicate, the one or more stored values to driver component 415-*b*, and driver component 415-*b* may activate/deactivate particular drivers based on the received value. In some cases, row command encoder 435-*b* and/or column command encoder 440-*b* may generate a bus width configuration command based on receiving an indication of the bus width from bus width configuration component 410-*b* and transmit the bus width configuration command over row C/A channel 465-*b* or column C/A channel 470-*b*, respectively.

Driver component 415-*b* may be configured to generate parallel row and column C/A signals based on a pin configuration determined by bus width configuration component 410-*b*. Driver component 415-*b* may transmit row C/A/signals using one or more of first pin 445-*b* to Kth pin 450-*b* and may transmit column C/A signals using one or more of second pin 455-*b* to Nth pin 460-*b*. In some examples, driver component 415-*b* may be configured to transmit row C/A signals using one or more of first pin 445-*b* to Kth pin 450-*b* and one or more of second pin 455-*b* to Nth pin 460-*b*. And driver component 415-*b* may be configured to transmit column C/A signals using one or more of first pin 445-*b* to Kth pin 450-*b* and one or more of second pin 455-*b* to Nth pin 460-*b*. By receiving row C/A signals over drivers that are connected to one or more of second pin 455-*b* or Nth pin 460-*b*, and vice versa, the quantity of pins used to convey row and column C/A signaling may be reduced.

First pin 445-*b* to Kth pin 450-*b* may be configured to provide a signaling interface between host device 400-*b* and row C/A channel 465-*b*. In some cases, the quantity of pins (K) included in host device 400-*b* is selected to accommodate the transmission of the largest row C/A combination within a single cycle. Second pin 455-*b* to Nth pin 460-*b* may be configured to provide a signaling interface between host device 400-*b* and column C/A channel 470-*b*. In some cases, the quantity of pins (N) included in host device 400-*b* is selected to accommodate the transmission of the largest column C/A combination within a single cycle.

Figure 5A:
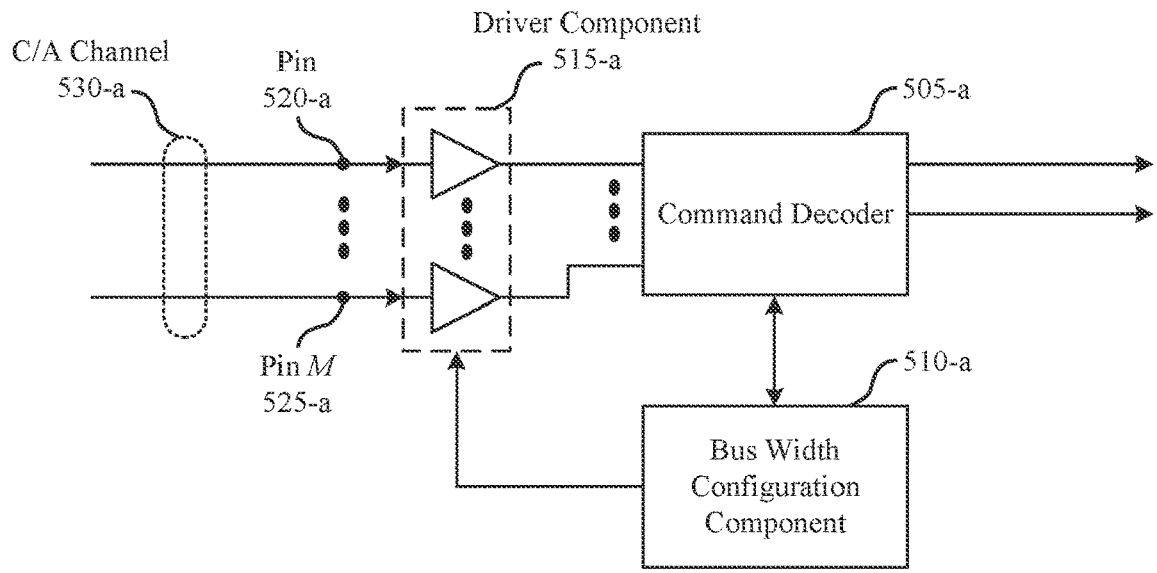
FIGS. 5A and 5B illustrate aspects of exemplary device controllers that support configuring a C/A channel as disclosed herein.

FIG. 5A illustrates aspects of an exemplary device controller that supports configuring a C/A channel in accordance with various aspects of the present disclosure.

Device controller 500-*a* may be configured to receive control and address information over a dynamically configurable C/A channel. Device controller 500-*a* may be configured to receive data information over a dynamically configurable data channel. In some cases, device controller may be an example of a device memory controller 155, a local memory controller 165, a local memory controller 260, or a memory device 310, as described with reference to FIGS. 1 through 3. Device controller 500-*a* may include command decoder 505-*a*, bus width configuration component 510-*a*, driver component 515-*a*, and first pin 520-*a* to Mth pin 525-*a*. Device controller 500-*a* may be coupled with and communicate with an external controller (e.g., host device 400-*a* as described with reference to FIG. 4A) over C/A channel 530-*a*.

In some cases, a receiver, such as memory device transceiver 340 as described with reference to FIG. 3, may include any one of command decoder 505-*a*, bus width configuration component 510-*a*, driver component 515-*a*, and first pin 520-*a* to Mth pin 525-*a*, or any combination thereof.

Command decoder 505-*a* may be configured to decode a received signal according to a configured modulation and encoding scheme. Command decoder 505-*a* may be further configured to obtain a command and memory address based on a configuration of C/A channel 530-*a*. In some cases, command decoder 505-*a* may decode an encoded signal received from driver component 515-*a* to obtain a command and memory address represented by a signal transmitted over C/A channel 530-*a*. In some cases, command decoder 505-*a* decodes a received signal based on a configured bus width. That is, command decoder 505-*a* may be configured to decode a command and memory address based on a determined configuration of C/A channel 530-*a*. For example, if a subset of signal paths included in C/A channel 530-*a* are used to convey a C/A signal, then command decoder may be configured to decode a received C/A signal using a corresponding subset of drivers and over a determined quantity of cycles.

Bus width configuration component 510-*a* may be configured to determine a quantity of pins and/or cycles to use for receiving a C/A signal over a dynamically configured C/A channel 530-*a*. For example, bus width configuration component 510-*a* may determine a quantity of pins and/or cycles to use for receiving a C/A signal based on a received signal—e.g., bus width configuration component 510-*a* may determine that certain pins are disabled based on a voltage pattern across the signal paths of C/A channel 530-*a*. In another example, bus width configuration component 510-*a* may determine a quantity of pins and/or cycles to use for receiving a C/A signal based on a received bus width configuration command.

Bus width configuration component 510-*a* may be further configured to store a value corresponding to the determined quantity of pins and/or cycles for receiving a C/A signal—e.g., in a bus width configuration register that is included within or external to bus width configuration component 510-*a*. Bus width configuration component 510-*a* may be further configured to program the command decoder 505-*a* by indicating, or causing the bus width configuration register to indicate, the stored value to command decoder 505-*a*. For example, bus width configuration component 510-*a* may indicate, or cause the bus width configuration register to indicate, to command decoder 505-*a* a stored value corresponding to a pin configuration, and command decoder 505-*a* may use decoding scheme corresponding to the indicated value/pin configuration—e.g., if a binary modulation scheme DDR signaling is used and bus width configuration component 510-*a* indicates to command decoder 505-*a* that six (6) pins are enabled, then command decoder 505-*a* may determine that received row activation commands are spread across two cycles.

Bus width configuration component 510-*a* may be similarly configured to program the driver component 515-*a* by indicating, or causing the bus width configuration register to indicate, the stored value to driver component 515-*a*. For example, bus width configuration component 510-*a* may indicate to driver component 515-*a* a stored value corresponding to a pin configuration, and driver component 515-*a* may activate/disable drivers according to the indicated value/pin configuration—e.g., if the pin configuration indicates that pins 1 and 2 should be active and pins 3, 4, and M should be inactive, then driver component 515-*a* may disable the corresponding drivers 3, 4, and M.

Driver component 515-*a* may be configured to receive a signal and output one or more voltages representing a binary value. That is, if a voltage of a signal received at a driver of driver component 515-*a* is at or near a voltage level that is representative of a binary value, the driver may output that voltage level to command decoder 505-*a*. In some cases, driver component 515-*a* outputs voltages using only the activated drivers in driver component 515-*a*.

First pin 520-*a* to Mth pin 525-*a* may be configured to provide a signaling interface between device controller 500-*a* and C/A channel 530-*a*. In some cases, the quantity of pins (M) included in device controller 500-*a* is selected to accommodate the transmission of the largest C/A combination within a single cycle. For example, if 21 bits are used to convey the largest C/A combination and a binary modulation scheme and double data rate signaling are used, than M may be equal to eleven (11) pins.

Figure 5B:
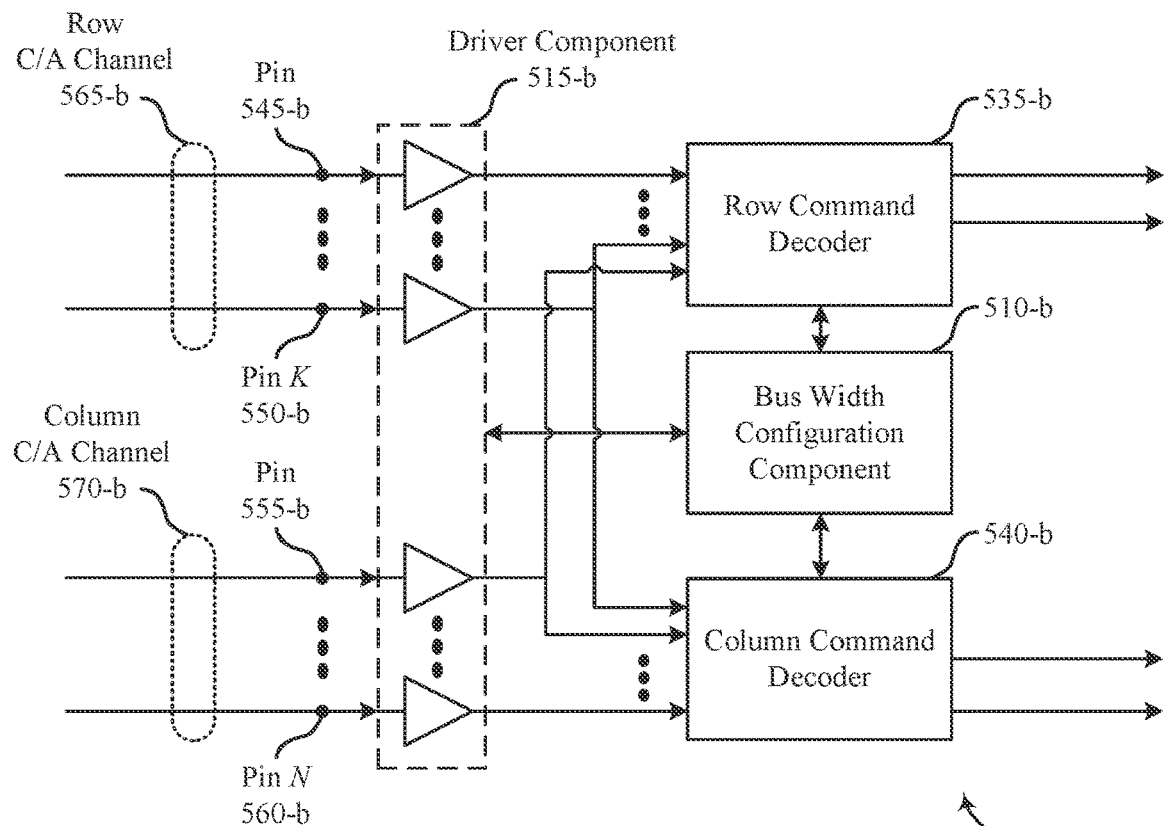

FIG. 5B illustrates aspects of an exemplary device controller that supports configuring a C/A channel in accordance with various aspects of the present disclosure.

Device controller 500-*b* may be an example of device controller 500-*a*, as described with reference to FIG. 5A. Device controller 500-*b* may include bus width configuration component 510-*b* and driver component 515-*b*, which may be examples of bus width configuration component 510-*a* and driver component 515-*a*, as described with reference to FIG. 5A. Device controller 500-*b* may also include row command decoder 535-*b*, column command decoder 540-*b*, first pin 545-*b*, Kth pin 550-*b*, second pin 555-*b*, and Nth pin 560-*b*. Device controller 500-*b* may be coupled with and communicate over row C/A channel 565-*b* and column C/A channel 570-*b*, which may be examples of channels 115, as described with reference to FIG. 1.

In some cases, a receiver, such as memory device transceiver 340 as described with reference to FIG. 3, may include any one of bus width configuration component 510-*b*, driver component 515-*b*, row command decoder 535-*b*, column command decoder 540-*b*, first pin 545-*b* to Kth pin 550-*b*, and second pin 555-*b* to Nth pin 560-*b*, or any combination thereof.

Row command decoder 535-*b* may be configured to decode a received signal to identify a row command and row address conveyed in the signal. Row command decoder 535-*b* may be further configured to identify the row command and row address based on a configuration of row C/A channel 565-*b*. For example, row command decoder 535-*b* may decode a row command and row address over multiple clock cycles based on a quantity of pins used to convey a C/A signal. In some cases, row command decoder 535-*b* decodes a received signal based on a value received from bus width configuration component 510-*b* that corresponds to a pin configuration.

Bus width configuration component 510-*b* may be configured to determine a quantity of pins and/or cycles to use for receiving a row C/A signal over row C/A channel 565-*b*. For example, bus width configuration component 510-*b* may determine a quantity of pins and/or cycles to use for receiving a row C/A command based on a quantity of active signal path in row C/A channel 565-*b* or a received bus width configuration message received over row C/A channel. Bus width configuration component 510-*b* may be similarly configured to dynamically determine a quantity of pins and/or cycles to use for receiving a C/A signal over column C/A channel 570-*b*.

Bus width configuration component 510-*b* may be further configured to store one or more values corresponding to the determined quantity pins and/or cycles for transmitting over row C/A channel 565-*b* and column C/A channel 570-*b*—e.g., in a bus width configuration register that is included within or external to bus width configuration component 510-*b*.

Bus width configuration component 510-*a* may indicate, or cause the bus width configuration register to indicate, the one or more stored values to row command decoder 535-*b* and column command decoder 540-*b*, and row command decoder 535-*b* and column command decoder 540-*b* may decode commands based on a pin configuration and corresponding timings that corresponds to the stored value. For example, if bus width configuration component 510-*b* indicates that six of first pin 545-*b* to Kth pin 550-*b* are active and binary and DDR signaling is used, then row command decoder may decode a received 21-bit row activation command over two clock cycles. Bus width configuration component 510-*a* may also indicate, or cause the bus width configuration register to indicate, the one or more stored values to driver component 515-*b*, and driver component 515-*b* may activate/deactivate drivers corresponding to the activated/deactivated pins indicated by the stored value/pin configuration.

Driver component 515-*b* may be configured to receive parallel row and column CA/signals based on a pin configuration indicated by bus width configuration component 510-*b*. Driver component 515-*b* may receive row C/A signals using one or more of first pin 545-*b* to Kth pin 550-*b* and may receive column C/A signals using one or more of second pin 555-*b* to Nth pin 560-*b*. In some examples, driver component 515-*b* may be configured to receive row C/A signals using one or more of first pin 545-*b* to Kth pin 550-*b* and one or more of second pin 555-*b* to Nth pin 560-*b*. And driver component 515-*b* may be configured to receive column C/A signals using one or more of first pin 545-*b* to Kth pin 550-*b* and one or more of second pin 555-*b* to Nth pin 560-*b*. By receiving row C/A signals over drivers that are connected to one or more of second pin 555-*b* or Nth pin 560-*b*, and vice versa, the quantity of pins used to convey row and column C/A signaling may be reduced.

First pin 545-*b* to Kth pin 550-*b* may be configured to provide a signaling interface between device controller 500-*b* and row C/A channel 565-*b*. In some cases, the quantity of pins (K) included in device controller 500-*b* is selected to accommodate the transmission of the largest row C/A combination within a single cycle. Second pin 555-*b* to Nth pin 560-*b* may be configured to provide a signaling interface between device controller 500-*b* and column C/A channel 570-*b*. In some cases, the quantity of pins (N) included in device controller 500-*b* is selected to accommodate the transmission of the largest column C/A combination within a single cycle.

Figure 6A:
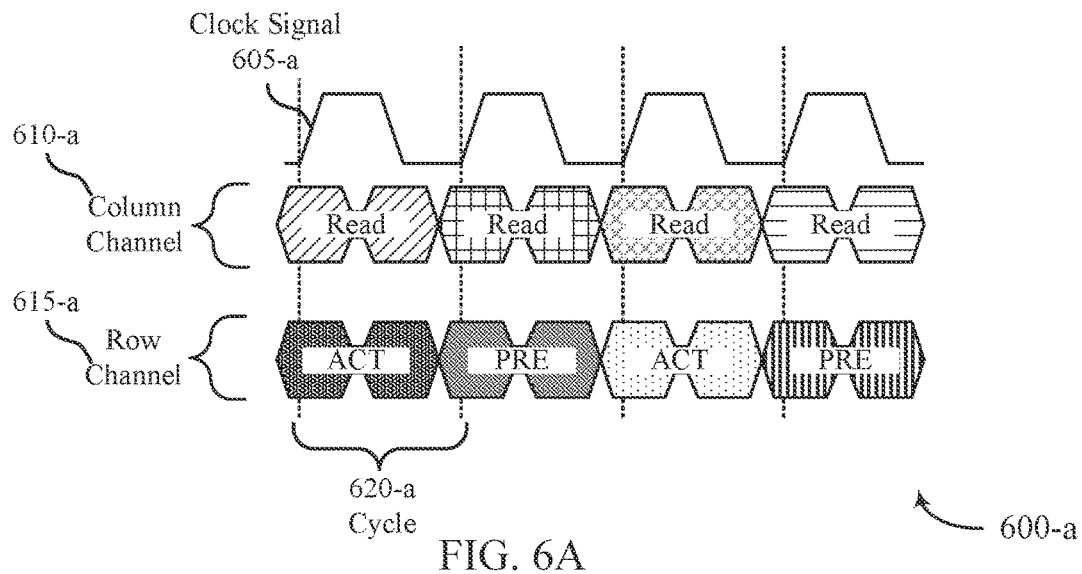
FIGS. 6A through 6C illustrate exemplary timing diagrams for configuring a C/A channel as disclosed herein.

FIG. 6A illustrates an exemplary timing diagram for configuring a C/A channel as disclosed herein.

Figure 6B:
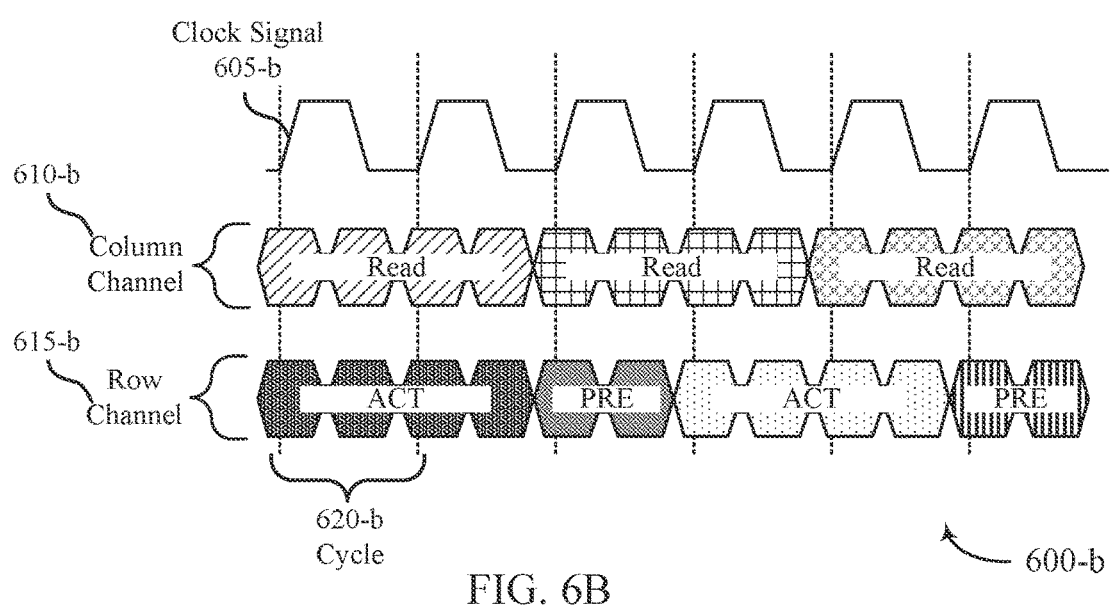
Figure 6C:
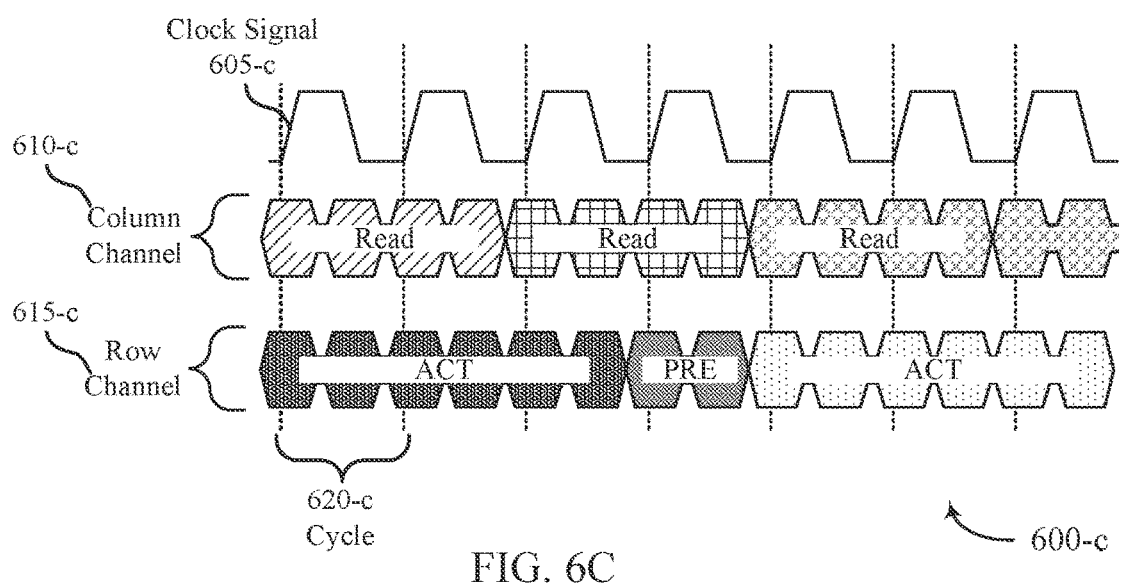

FIGS. 6A through 6C illustrate one or more operations of a dynamically configurable C/A channel. Timing diagram 600-*a* depicts an exemplary communication between host device 400-*b* described with reference to FIG. 4B and device controller 500-*b* described with reference to FIG. 5B over column channel 610-*a* and row channel 615-*a*. In the example of FIGS. 6A through 6C, DDR signaling and a binary modulation scheme may be used to communicate information.

Clock signal 605-*a* may provide a signal that informs a receiving device, such as device controller 500-*b*, when to latch (e.g., store) information communicated over a channel. For example, a receiving device may process a signal on a channel after identifying that clock signal 605-*a* has transitioned from a low voltage to a high voltage. As discussed herein, when DDR signaling is used, first information may be signaled at a rising edge of a clock pulse and second information may be signaled at a falling edge of the clock pulse. Thus, when DDR signaling is used, the receiving device may also process a second signal on the channel after identifying that clock signal 605-*a* has transitioned from the high voltage to the low voltage.

As depicted in FIG. 6A, a read command may be transmitted over column channel 610-*a* every cycle 620-*a* and alternating ACT and PRE commands may be transmitted over row channel 615-*a* every cycle 620-*a*. In some cases, an ACT command may include twenty-one (21) bits—1 command bit, 4 bank address bits, and 16 row address bits—a read may include thirteen (13) bits—3 command bits, 4 bank address bits, and 7 column address bits—and a PRE command may include seven (7) bits—3 command bits and 4 bank address bits. An equation to determine the quantity of pins ($N_{Pins}$) used to communicate over column channel 610-*a* and row channel 615-*a* may be represented by the following equation:

$$N_{Pins} = RoundUp\left(\frac{N_{Bits}}{2 * N_{cycles}}\right);$$

where $N_{Bits}$ represents the quantity of bits used to convey a command, $N_{cycles}$ represents the quantity of cycles used to transmit the command, and where $N_{cycles}$ is multiplied by two (2) because DDR signaling is used.

In some cases, a maximum quantity of pins dedicated to a C/A channel may be determined to be used to communicate signals based on identifying a quantity of pins capable of transmitting row and column commands within a single cycle 620-*a*. Applying the above equation, eleven (11) row pins may be used by host device 400-*b* and device controller 500-*b* to transmit and receive row commands over row channel 615-*a*—e.g., based on the largest row command including 21 bits. Similarly, seven (7) column pins may be used to transmit and receive column commands over column channel 610-*a*—e.g., based on the read command including 13 bits. Accordingly, in the example as described with reference to FIG. 6A, a maximum quantity of pins dedicated to a C/A channel may equal eighteen (18) pins. In some cases, a C/A channel is configured to use the maximum quantity of pins as a default configuration to ensure that control information and data may be transferred at a desired rate.

FIG. 6B illustrates an exemplary timing diagram for configuring a C/A channel as disclosed herein.

Timing diagram 600-*b* depicts one or more communications between host device 400-*b* as described with reference to FIG. 4B and device controller 500-*b* as described with reference to FIG. 5B over column channel 610-*b* and row channel 615-*b*. Clock signal 605-*b* may be similarly configured to clock signal 605-*a* as described with reference to FIG. 6A.

In one example, the quantity of pins used to convey C/A signaling may be reduced relative to FIG. 6A. A quantity of pins used to convey C/A signaling may be reduced to conserve power or to free up pins to be used for data transmissions. The quantity of pins may be reduced based on determining that a quantity of commands in a command queue is below a threshold, based on determining that a page hit rate is above a threshold, or a combination thereof. In some examples, the row pin count may be reduced to six (6) row pins and the column pin count may be maintained at four (4) column pins, reducing the total quantity of pins used by a C/A channel to ten (10) pins.

As illustrated in FIG. 6B, as the quantity of pins is reduced, the length of some commands may increase relative to FIG. 6A. For example, applying the equation provided above, if the row pin count is reduced to six (6) row pins and the column pin count is reduced to four (4) column pins, then a quantity of cycles 620-b used to communicate ACT and read commands may be increased to two (2) cycles 620-b. In some cases, a quantity of cycles 620-b used to communicate a PRE command may remain the same—e.g., at one (1) cycle 620-b. In some cases, when the length of a read command is increased, a burst length may also be increased to ensure full utilization of a data bus—e.g., if a length of a read command is doubled, then a burst length may also be doubled.

In another example, the quantity of pins used to convey C/A signaling may be increased relative to FIG. 6C. As discussed herein, a quantity of pins used to convey C/A signaling may be increased to avoid latency in command execution. As also discussed herein, the quantity of pins may be increased based on determining that a quantity of commands in a command queue is above a threshold, based on determining that a predicted page hit rate is below a threshold, or the like.

FIG. 6C illustrates an exemplary timing diagram for configuring a C/A channel as disclosed herein.

Timing diagram 600-c depicts an exemplary communication between host device 400-b as described with reference to FIG. 4B and device controller 500-b as described with reference to FIG. 5B over column channel 610-c and row channel 615-c. Clock signal 605-c may be similarly configured to clock signal 605-a and clock signal 605-b of FIGS. 6A and 6B.

In one example, the quantity of pins used to convey C/A signaling may be reduced relative to FIGS. 6A and/or 6B, similar to the discussion in FIG. 6B—e.g., to increase power savings or to make additional pins available for data communications.

In FIG. 6C, the row pin count may be reduced to four (4) row pins and the column pin count may be maintained at four (4) column pins, reducing the total quantity of pins used by a C/A channel to eight (8) pins. Using the above equation, a quantity of cycles 620-c used to communicate ACT commands may be increased to three (3) cycles 620-c and a quantity of cycles 620-c used to communicate read commands may be maintained at two (2) cycles. In some cases, a quantity of cycles 620-b used to communicate a PRE command may remain the same—e.g., at one (1) cycle 620-b.

In some cases, the row pin count may be reduced to four (4) pins after determining that a page hit rate is equal to or greater than two (2)—or based on determining that a rate of ACT commands is below a threshold.

Figure 7:
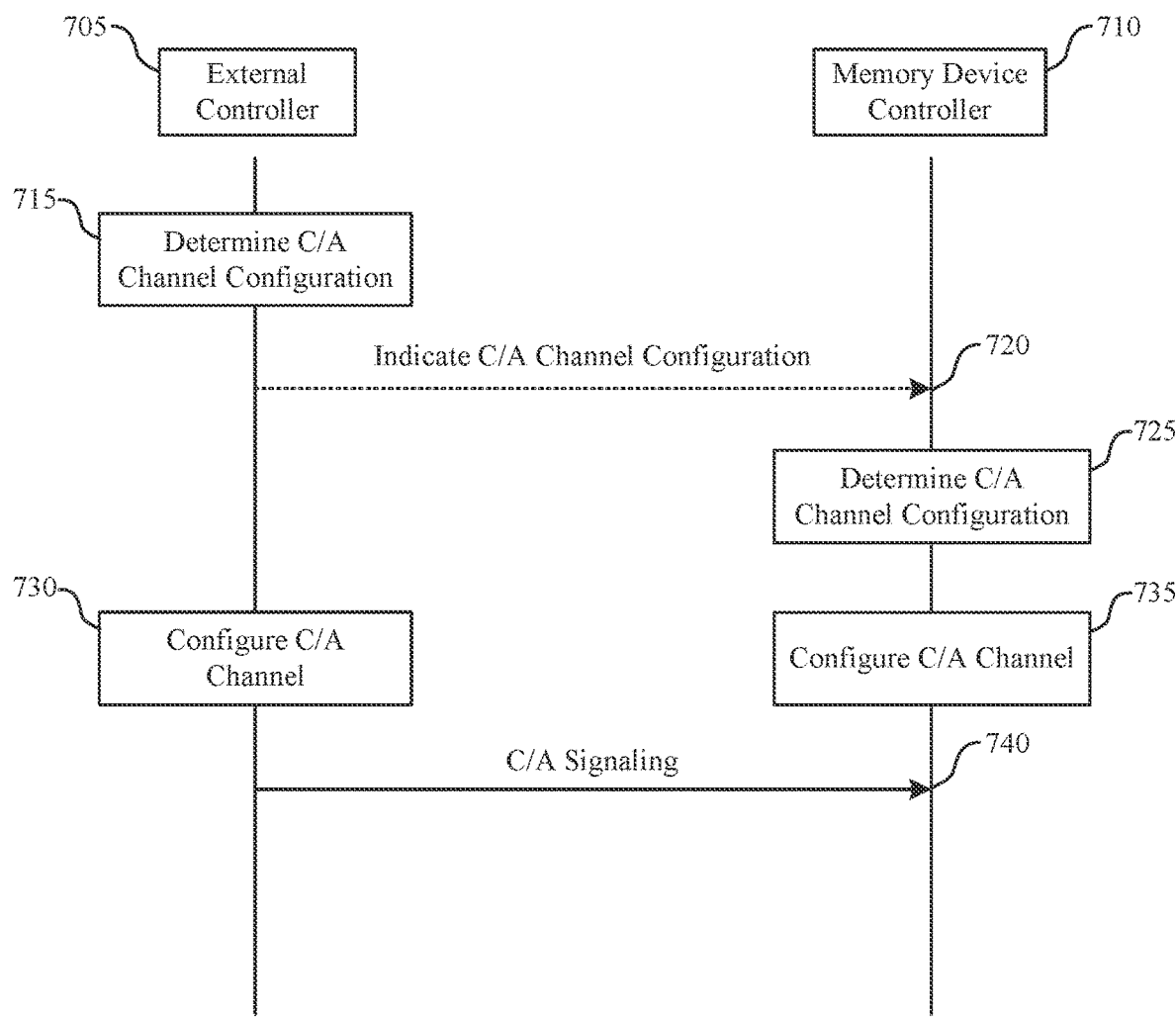
FIG. 7 illustrates a process flow for configuring a C/A channel as disclosed herein.

FIG. 7 illustrates a process flow for configuring a C/A channel as disclosed herein.

Process flow 700 may illustrate one or more communications between external controller 705 and memory device controller 710 over a dynamically configurable C/A channel or one or more functions performed by the external controller 705 and/or the memory device controller 710. External controller 705 may be an example of an external memory controller 105, a controller 305, a host device 400-a, or a host device 400-b, as described with reference to FIGS. 1, 3, 4A, and 4B. Memory device controller 710 may be an example of a memory device 110, a device memory controller 155, a local memory controller 165, a local memory controller 260, a memory device 310, a device controller 500-a, or a device controller 500-b, as described with reference to FIGS. 1 through 3, 5A, and 5B.

At 715, external controller 705 may determine a C/A channel configuration. Determining a C/A channel configuration may include determining a quantity of pins of the C/A channel to configure for communicating C/A signaling with memory device controller 710. As discussed herein, the quantity of pins to configure may be based on prior or future operation of a memory system, a size of different types of C/A signaling, a state of the system (e.g., a power-on or initialization state), a quantity of commands in a command queue, and the like. For example, determining the quantity of pins to configure may be based on identifying a quantity of unused command slots in a prior time period—e.g., external controller 705 may disable pins based on determining that the quantity of unused command slots exceeds a threshold value. In some cases, determining the quantity of pins to configure may be based on an operating parameter of memory device controller 710. For example, external controller 705 may disable pins based on determining that a temperature of memory device controller 710 is below a threshold—e.g., because a rate of refresh commands may be reduced at lower temperatures. In another example, external controller 705 may disable pins to support a power consumption level of memory device controller 710—e.g., because a rate of refresh commands may be reduced at lower temperatures.

In some cases, determining a C/A channel configuration also includes determining a quantity of cycles for communicating different types of C/A signaling with memory device controller 710. As discussed herein, the quantity of cycles for a type of C/A signaling may be adapted as the quantity of pins is adapted—e.g., the quantity of cycles for a particular type of C/A signaling may be increased as the quantity of pins is decreased. In some cases, determining the C/A channel configuration may include determining whether a single C/A channel or dual C/A channels (e.g., a row C/A and column C/A channel) are used. In some cases, determining the C/A channel configuration may include identifying a default C/A channel configuration (e.g., at power-on). In some cases, a bus width configuration component located at external controller 705 determines the C/A channel configuration and stores a value that corresponds to the current C/A channel configuration.

In some cases, determining the C/A channel configuration may include determining whether a single C/A channel or dual C/A channels (e.g., a row C/A and column C/A channel) are used. For example, when dual C/A channels are used, external controller 705 may separately configure the different C/A channels.

At 720, external controller 705 may indicate the C/A channel configuration to memory device controller 710. In some cases, external controller 705 transmits an explicit indication of the C/A channel configuration to memory device controller 710. For example, external controller 705 may transmit, in a bus width configuration message, a value stored at a bus width configuration component that corresponds to a particular C/A channel configuration. Memory device may receive the bus width configuration message and determine a configuration of the C/A channel based on the value in the bus width configuration message. In some examples, external controller 705 may transmit the value of the bus width configuration component with an access command, such as a RD, WR, ACT, or PRE command. In another example, external controller 705 may implicitly indicate the C/A channel configuration by driving certain pins to either high or low levels after a reset occurs—e.g., pins that are driven to high levels may be identified by memory device controller 710 as being disabled. In some cases, external controller 705 may transmit the indication over different pins than those used to transmit C/A signaling to memory device controller 710.

At 725, memory device controller 710 may determine a C/A channel configuration. In some cases, memory device controller 710 may determine the C/A channel configuration without receiving an indication from external controller 705—e.g., by identifying a default configuration at power up. In other cases, memory device controller 710 may determine the C/A channel configuration based on an explicit (e.g., using a bus width configuration message) or implicit (e.g., using a voltage pattern) indication received from external controller 705. In some cases, the memory device controller 710 may determine a C/A channel configuration using the same procedures described with reference to 715 and/or the external controller 705.

At 730, external controller 705 may configure the C/A channel. Configuring the C/A channel may include activating and deceiving particular pins at external controller 705 based on the determined quantity of pins. For example, if the determined quantity of pins is less than an available quantity of pins, then external controller 705 may disable the unused pins. This may also be referred to as configured a C/A bus width. In some examples, external controller 705 may program a C/A bus width by driving certain pins to either a high or low level (e.g., after a reset occurs). Configuring the C/A channel may also include configuring one or more components (e.g., an encoder, driver component, and/or transmitter) at external controller 705 that are coupled with the C/A channel based on the determined quantity of pins and/or quantity of cycles. For example, external controller 705 may configure an encoder to generate a command that spans multiple cycles if the quantity of pins for transmitting the command is reduced. Also, external controller 705 may configure a driver component to disable drivers that are coupled with disabled pins.

At 735, memory device controller 710 may configure the C/A channel. Configuring the C/A channel may include activating and deceiving particular pins at memory device controller 710 based on the determined quantity of pins. For example, if the determined quantity of pins is less than an available quantity of pins, then memory device controller 710 may disable the unused pins. Configuring the C/A channel may also include configuring one or more components (e.g., a decoder, and/or receiver) at memory device controller 710 that are coupled with the C/A channel based on the determined quantity of pins and/or quantity of cycles. For example, memory device controller 710 may configure a decoder to process a received signal over spans multiple cycles if a quantity of pins is disabled. Also, memory device controller 710 may configure a receiver to disable receiving components or drivers that are coupled with disabled pins.

As discussed herein, in some cases, memory device controller 710 may adapt the C/A channel configuration during operation of a system that includes the external controller 705 and the memory device controller 710 (e.g., the C/A channel configuration may be adapted on-the-fly). For example, the C/A channel configuration may be adapted based on receiving the bus width configuration message. In some cases, memory device controller 710 observes a time-out duration between reconfiguring the C/A channel and processing a subsequent command. During a time-out period, memory device controller 710 and/or external controller 705 may refrain from communicating any additional commands. Memory device controller 710 and/or external controller 705 may use the time-out period to reconfigure components (e.g., encoders, decoders, receivers, transmitters, and/or drivers) to support the current C/A channel configuration. The time-out period may also allow previous commands to be processed according to the previous C/A channel configuration.

In some cases, external controller 705 and memory device controller 710 both include a command truth table for each of the different C/A channel configurations that may be used to identify and process commands received in C/A signaling.

At 740, external controller 705 may transmit C/A signaling to memory device controller 710 over the C/A channel according to the current C/A channel configuration. That is, external controller 705 may transmit C/A signaling using the enabled pins located at external controller 705 and according to the corresponding command timings—e.g., if six (6) row pins are enabled, external controller 705 may transmit an ACT command over a row C/A channel using the six (6) enabled row pins and over two cycles. When a dual C/A channel is used, external controller 705 may transmit row C/A signaling (e.g., ACT commands) over a row C/A channel and may transmit column C/A signaling (e.g., read and write commands) over a column C/A channel.

Also, memory device controller 710 may receive the C/A signaling from external controller 705 over the C/A channel according to the current C/A channel configuration. That is, memory device may receive the C/A signaling using the enabled pins located at memory device controller 710 and according to the corresponding command timings, where the enabled pins at memory device controller 710 may correspond to the enabled pins located at external controller 705. For example, if six (6) row pins are enabled, memory device controller 710 may receive an ACT command over a row C/A channel using the six (6) enabled row pins and over two cycles. In some cases, memory device controller 710 identifies that an ACT command is, or is in the process of being, received based on determining that a first information bit of a received signal is a logic "0" or some other predetermined symbol (e.g., in the case of modulation schemes that include three or more symbols).

After receiving the C/A signaling, memory device controller 710 may decode the received C/A signaling to identify the command and address information. Memory device controller 710 may then provide the decoded command and memory address to a memory array, which may access the memory cell(s) located at the identified memory address according to the decoded command.

The order that some operations described above are performed may be rearranged, omitted, and/or performed in parallel. For example, the determination at 725 may be performed after or concurrently with the configuration at 730.

Figure 8:
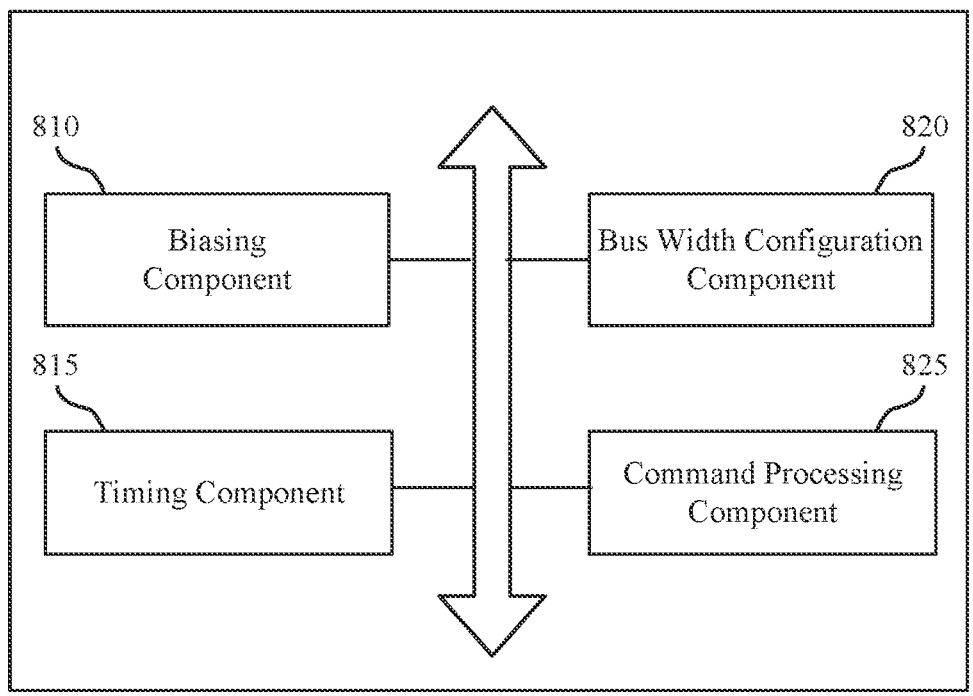
FIG. 8 illustrates a block diagram representing aspects of a controller that supports configuring a C/A channel as disclosed herein.

FIG. 8 illustrates a block diagram representing aspects of a controller 800 that supports configuring a C/A channel as disclosed herein. The controller 800 may be an example of an external memory controller 105, a device memory controller 155, a local memory controller 165, a local memory controller 260, or a combination thereof as described with reference to FIGS. 1 and 2.

Controller 800 includes biasing component 810, timing component 815, bus width configuration component 820, and command processing component 825. Controller 800 may be an example of external memory controller 105, device memory controller 155, local memory controller 165, local memory controller 260, or controller 305, as described with reference to FIGS. 1 through 3.

Biasing component 810 may be configured to apply voltages and or currents in a memory system. In some cases, biasing component 810 may be configured to apply voltages of a larger signal to a channel that connect devices in a memory system.

Timing component 815 may be configured to provide one or more clock signals throughout a memory system. In some cases, timing component 815 may be configured to trigger the biasing component 810 to apply voltages or currents in the memory system. Timing component 815 be further configured to trigger other components in the memory system to process signals and to perform memory operations.

In some examples, bus width configuration component 820 may be configured to determine a first quantity of pins of a channel for receiving one or more commands (e.g., row or column commands and/or addresses) from a host device and/or a second quantity of cycles for receiving the one or more commands from the host device. Bus width configuration component 820 may also be configured to configure a component (e.g., a receiver and/or decoder) coupled with the channel based on the first quantity of pins and the second quantity of cycles. Command processing component 825 may be configured to receive a command over the channel based on configuring the component.

In some cases, bus width configuration component 820 may also be configured to receive, from the host device, an indication of the first quantity of pins for receiving the one or more commands, or the second quantity of cycles for the one or more commands, or both, and may determine the first quantity of pins and the second quantity of cycles is based on the indication. In some cases, the indication is a second command. In other cases, the indication is an access command that includes the indication. In some cases, the indication is communicated over different pins of a channel than the pins used to communicate the access command. In some cases, bus width configuration component 820 may also be configured to determine that a duration since receiving the indication satisfies a timing threshold, wherein receiving the command occurs after the timing threshold is satisfied.

In some cases, bus width configuration component 820 may also configure a second component (e.g., a second receiver and/or a second decoder) coupled with a second channel for receiving one or more commands (e.g., row commands and/or addresses) from the host device based on a third quantity of pins of the second channel and a fourth quantity of cycles for the one or more commands of the second channel. Command processing component 825 may be configured to receiving a second command over the second channel based on configuring the second component.

In some cases, bus width configuration component 820 may determine the first quantity and/or second quantity of cycles based on identifying an initialization event (e.g., a start-up, power-on, or reset event) of a memory device. In some cases, bus width configuration component 820 may determine the first quantity and/or second quantity of cycles based on identifying the operation parameter of the memory device. In some cases, the operation parameter comprises a power consumption parameter associated with the memory device, a third quantity of commands in a buffer of the memory device that satisfies a criteria, or both.

In some cases, bus width configuration component 820 may determine the first quantity of pins for receiving the one or more commands based at least in part on determining the second quantity of cycles for the one or more commands.

In some examples, bus width configuration component 820 may be configured to determine a first quantity of pins of a channel for transmitting one or more commands to a memory device and a second quantity of cycles for transmitting the one or more commands (e.g., row or column commands and/or addresses) to the memory device. Bus width configuration component 820 may also be configured to configure a component (e.g., a driver or encoder) coupled with the channel based at least in part on the first quantity of pins of the channel and the second quantity of cycles for transmitting the one or more commands. Command processing component 825 may be configured to transmit, to the memory device, a command over the channel based at least in part on configuring the component.

In some cases, bus width configuration component 820 and/or command processing component 825 may be configured to transmit, to the memory device, an indication (e.g., a bus width configuration command) of the first quantity of pins for transmitting the one or more commands, or the second quantity of cycles for the one or more commands, or both. In some cases, command processing component 825 may determine that a duration since transmitting the indication satisfies a timing threshold, wherein transmitting the command occurs after the timing threshold is satisfied based at least in part on the determination. In some cases, the timing threshold may indicate a lower-bound of a duration since receiving an indication. In some cases, the lower-bound may be a minimum amount of time.

In some cases, bus width configuration component 820 may be further configured to configure a second component (e.g., a second driver and/or second encoder) coupled with a second channel for transmitting one or more commands to the memory device based at least in part on a third quantity of pins of the second channel and a fourth quantity of cycles for the one or more commands of the second channel. In some cases, command processing component 825 may be configured to transmit a second command (e.g., a row command and/or address) over the second channel based at least in part on configuring the second component.

In some examples, bus width configuration component 820 may determine the first quantity of pins or the second quantity of cycles based on identifying an operation parameter of the memory device. In some cases, the operation parameter is a power consumption parameter associated with the memory device, a third quantity of commands in a buffer of the memory device that satisfies a criteria, or both. In bus width configuration component 820 may determine the first quantity of pins or the second quantity of cycles based on identifying a start-up event of a memory device.

Figure 9:
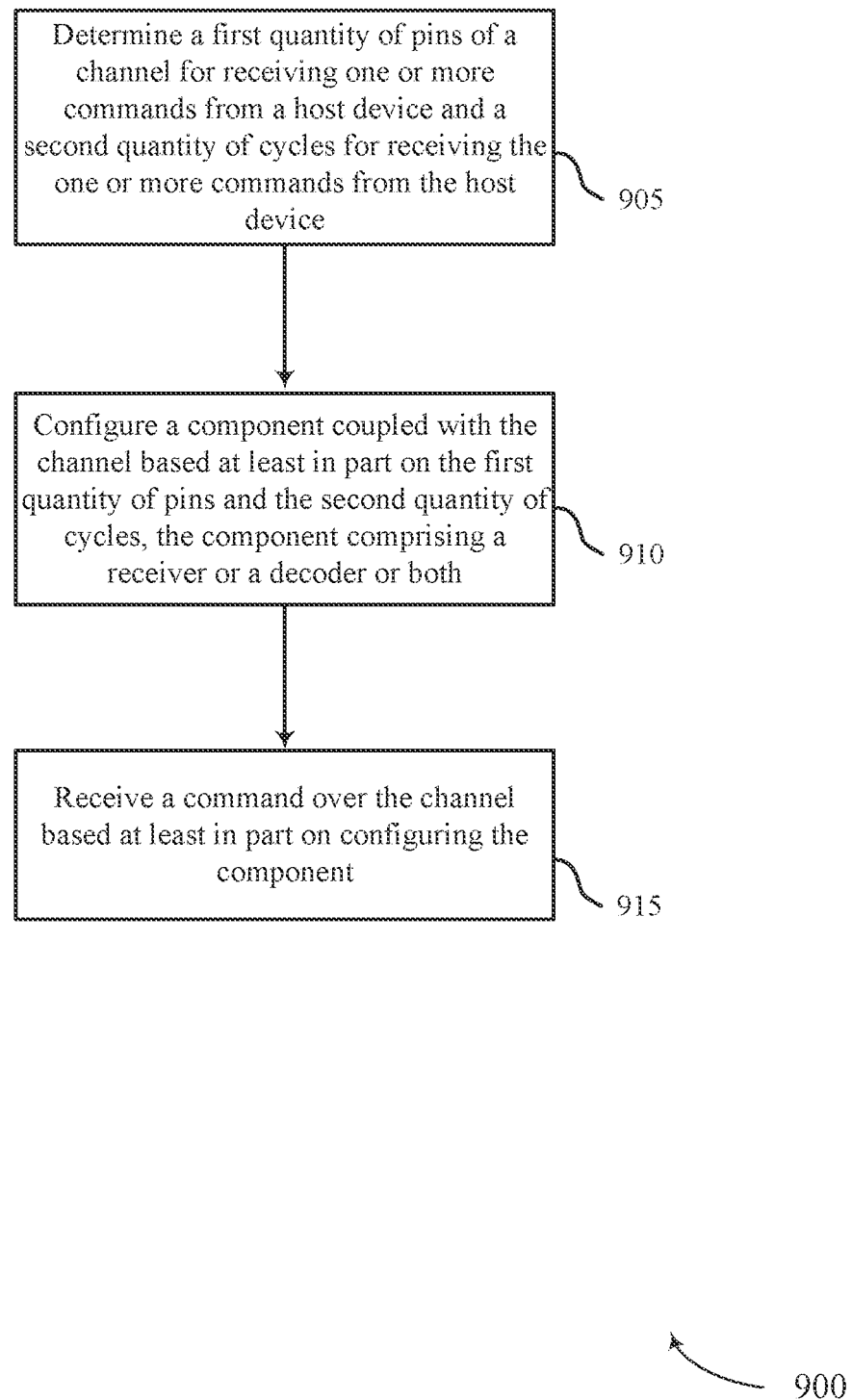
FIGS. 9 and 10 illustrate flowcharts of a method or methods for configuring a C/A channel as disclosed herein.

FIG. 9 illustrates a flowchart of a method 900 or methods for configuring a C/A channel in accordance with various examples as disclosed herein. In some cases, the method 900 may be implemented by a controller 800 as described with reference to FIG. 8.

At block 905, the method may include determining a first quantity of pins of a channel for receiving one or more commands from a host device and a second quantity of cycles for receiving the one or more commands from the host device, as described with reference to FIGS. 1 through 7. In certain examples, the operations of block 905 may be performed or facilitated by a controller, as described with reference to FIGS. 1, 2, 3, and 8.

At block 910, the method may include configuring a component coupled with the channel based at least in part on the first quantity of pins and the second quantity of cycles, the component comprising a receiver or a decoder or both, as described with reference to FIGS. 1 through 7. In certain examples, the operations of block 910 may be performed or facilitated by a controller, as described with reference to FIGS. 1, 2, 3, and 8.

At block 915, the method may include receiving a command over the channel based at least in part on configuring the component, as described with reference to FIGS. 1 through 7. In certain examples, the operations of block 915 may be performed or facilitated by a controller, as described with reference to FIGS. 1, 2, 3, and 8.

In some examples, an apparatus as described herein may perform a method or methods, such as the method 900. The apparatus may include features, means, or instructions (e.g., a non-transitory computer-readable medium storing instructions executable by a processor) for determining a first quantity of pins of a channel for receiving one or more commands from a host device and a second quantity of cycles for receiving the one or more commands from the host device; configuring a component coupled with the channel based at least in part on the first quantity of pins and the second quantity of cycles, the component comprising a receiver or a decoder or both; and receiving a command over the channel based at least in part on configuring the component.

Some examples of the method, apparatuses, and non-transitory computer-readable medium described herein may further include operations, features, means, or instructions for receiving, from the host device, an indication of the first quantity of pins for receiving the one or more commands, or the second quantity of cycles for the one or more commands, or both, wherein determining the first quantity of pins and the second quantity of cycles is based at least in part on the indication. In some examples of the method, apparatuses, and non-transitory computer-readable medium described herein, receiving the indication includes receiving, from the host device over the channel, a second command that includes the indication. In some examples of the method, apparatuses, and non-transitory computer-readable medium described herein, receiving the indication includes receiving, from the host device over the channel, an access command that includes the indication. In some examples of the method, apparatuses, and non-transitory computer-readable medium described herein, the indication is communicated over one or more pins of the channel that are different than one or more pins over which the access command is communicated.

Some examples of the method, apparatuses, and non-transitory computer-readable medium described herein may further include operations, features, means, or instructions for determining that a duration since receiving the indication satisfies a timing threshold, wherein receiving the command occurs after the timing threshold is satisfied.

Some examples of the method, apparatuses, and non-transitory computer-readable medium described herein may further include operations, features, means, or instructions for configuring a second component coupled with a second channel for receiving one or more commands from the host device based at least in part on a third quantity of pins of the second channel and a fourth quantity of cycles for the one or more commands of the second channel, the second component comprising a second receiver or a second decoder or both; and receiving a second command over the second channel based at least in part on configuring the second component.

Some examples of the method, apparatuses, and non-transitory computer-readable medium described herein may further include operations, features, means, or instructions for identifying an initialization event of a memory device, wherein determining the first quantity of pins and determining the second quantity of cycles is based at least in part on identifying the initialization event.

Some examples of the method, apparatuses, and non-transitory computer-readable medium described herein may further include operations, features, means, or instructions for identifying an operation parameter of a memory device, wherein determining the first quantity of pins or determining the second quantity of cycles is based at least in part on identifying the operation parameter of the memory device. In some examples of the method, apparatuses, and non-transitory computer-readable medium described herein, the operation parameter comprises a power consumption parameter associated with the memory device, a third quantity of commands in a buffer of the memory device that satisfies a criteria, or both.

In some examples of the method, apparatuses, and non-transitory computer-readable medium described herein, determining the first quantity of pins for receiving the one or more commands is based at least in part on determining the second quantity of cycles for the one or more commands.

Figure 10:
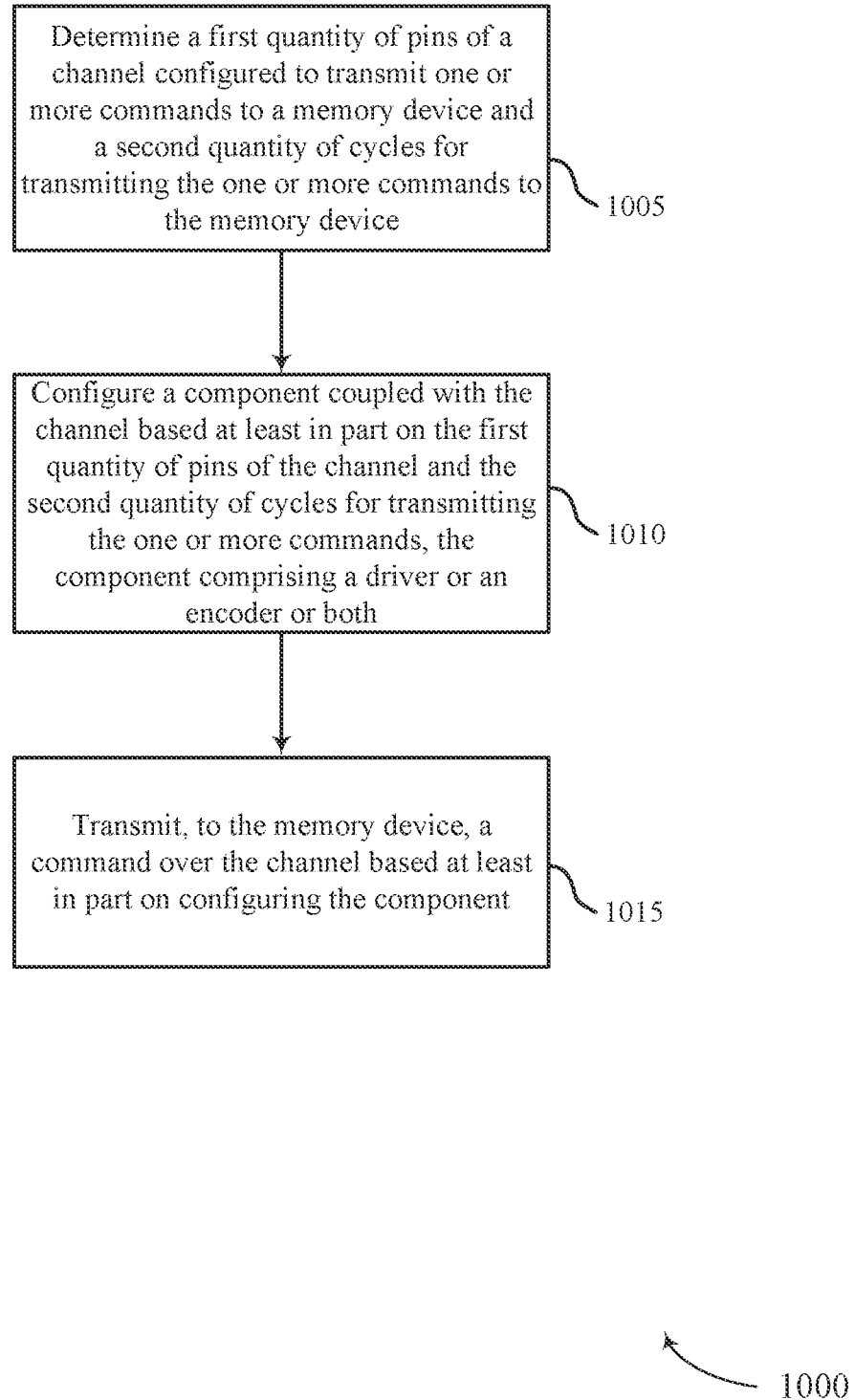

FIG. 10 illustrates a flowchart of a method 1000 or methods for configuring a C/A channel in accordance with various examples as disclosed herein. In some cases, the method 1000 may be implemented by a controller 800 as described with reference to FIG. 8.

At block 1005, the method may include determining a first quantity of pins of a channel configured to transmit one or more commands to a memory device and a second quantity of cycles for transmitting the one or more commands to the memory device, as described with reference to FIGS. 1 through 7. In certain examples, the operations of block 1005 may be performed or facilitated by a controller, as described with reference to FIGS. 1, 2, 3, and 8.

At block 1010, the method may include configuring a component coupled with the channel based at least in part on the first quantity of pins of the channel and the second quantity of cycles for transmitting the one or more commands, the component comprising a driver or an encoder or both, as described with reference to FIGS. 1 through 7. In certain examples, the operations of block 1010 may be performed or facilitated by a controller, as described with reference to FIGS. 1, 2, 3, and 8.

At block 1015, the method may include transmitting, to the memory device, a command over the channel based at least in part on configuring the component, as described with reference to FIGS. 1 through 7. In certain examples, the operations of block 1015 may be performed or facilitated by a controller, as described with reference to FIGS. 1, 2, 3, and 8.

In some examples, an apparatus as described herein may perform a method or methods, such as the method 1000. The apparatus may include features, means, or instructions (e.g., a non-transitory computer-readable medium storing instructions executable by a processor) for determining a first quantity of pins of a channel for transmitting one or more commands to a memory device and a second quantity of cycles for transmitting the one or more commands to the memory device; configuring a component coupled with the channel based at least in part on the first quantity of pins of the channel and the second quantity of cycles for transmitting the one or more commands, the component comprising a driver or an encoder or both; and transmitting, to the memory device, a command over the channel based at least in part on configuring the component.

Some examples of the method, apparatuses, and non-transitory computer-readable medium described herein may further include operations, features, means, or instructions for transmitting, to the memory device, an indication of the first quantity of pins for transmitting the one or more commands, or the second quantity of cycles for the one or more commands, or both.

Some examples of the method, apparatuses, and non-transitory computer-readable medium described herein may further include operations, features, means, or instructions for determining that a duration since transmitting the indication satisfies a timing threshold, wherein transmitting the command occurs after the timing threshold is satisfied based at least in part on the determination.

Some examples of the method, apparatuses, and non-transitory computer-readable medium described herein may further include operations, features, means, or instructions for configuring a second component coupled with a second channel for transmitting one or more commands to the memory device based at least in part on a third quantity of pins of the second channel and a fourth quantity of cycles for the one or more commands of the second channel, the second component comprising a second driver or a second encoder or both; and transmitting a second command over the second channel based at least in part on configuring the second component.

Some examples of the method, apparatuses, and non-transitory computer-readable medium described herein may further include operations, features, means, or instructions for identifying an operation parameter of the memory device, wherein determining the first quantity of pins or determining the second quantity of cycles is based at least in part on identifying the operation parameter of the memory device.

In some examples of the method, apparatuses, and non-transitory computer-readable medium described herein, the operation parameter is a power consumption parameter associated with the memory device, a third quantity of commands in a buffer of the memory device that satisfies a criteria, or both.

Some examples of the method, apparatuses, and non-transitory computer-readable medium described herein may further include operations, features, means, or instructions for identifying a start-up event of a memory device, wherein determining the first quantity of pins and determining the second quantity of cycles is based at least in part on identifying the start-up event.

It should be noted that the methods described above describe possible implementations, and that the operations and the steps may be rearranged or otherwise modified and that other implementations are possible. Furthermore, examples from two or more of the methods may be combined.

In some examples, an apparatus or device may perform aspects of the functions described herein using general, or special-purpose hardware. For example, an apparatus or device may include a first receiver comprising a plurality of pins for receiving one or more commands over a first channel; a first decoder coupled with the first receiver and for decoding the one or more commands received over the first channel; and a register coupled with the first receiver and the first decoder and for configuring a width of the first channel based at least in part on the one or more commands received over the first channel.

In some examples of the apparatus or device, the register is configured to determine a first quantity of pins of the first channel for receiving the one or more commands and is configured to determine a second quantity of cycles for the one or more commands.

In some examples, the apparatus or device includes a second receiver comprising a plurality of pins for receiving one or more commands over a second channel; and a second decoder coupled with the second receiver and for decoding the one or more commands received over the second channel, wherein the register is for configuring a width of the second channel based at least in part on the one or more commands received over the second channel, the register coupled with the second receiver and the second decoder. In some examples of the apparatus or device, the first channel is for communicating row commands and the second channel is for communicating column commands. In some examples of the apparatus or device, a first quantity of pins of the first channel is different than and is independently configurable from a second quantity of pins of the second channel.

In some examples, an apparatus or device may perform aspects of the functions described herein using general, or special-purpose hardware. For example, an apparatus or device may include a first driver comprising a plurality of pins for transmitting one or more commands over a first channel; a first encoder coupled with the first driver and for encoding the one or more commands transmitted over the first channel; and a register coupled with the first driver and the first encoder and for configuring a width of the first channel based at least in part on the one or more commands transmitted over the first channel.

In some examples of the apparatus or device, the register is for determining a first quantity of pins of the first channel for transmitting the one or more commands and determining a second quantity of cycles for the one or more commands.

In some examples, the apparatus or device includes a second driver comprising a plurality of pins for transmitting one or more commands over a second channel; and a second encoder coupled with the second driver and for encoding the one or more commands transmitted over the second channel, wherein the register is for configuring a width of the second channel based at least in part on the one or more commands transmitted over the second channel, the register coupled with the second driver and the second encoder.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" used herein refers to a stratum or sheet of a geometrical structure. Each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Btu-raw disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
configuring, at a first time, a component to use a first quantity of pins and a first quantity of cycles to communicate commands via a channel;
communicating, based at least in part on configuring the component at the first time, a command over the channel in accordance with the first quantity of pins and the first quantity of cycles; and
configuring, at a second time that occurs after the first time and based at least in part on observed information associated with the commands, the component to use a second quantity of pins, a second quantity of cycles, or both, to communicate the commands via the channel, the first quantity of pins being different than the second quantity of pins, the first quantity of cycles being different than the second quantity of cycles, or both.

2. The method of claim 1, further comprising:
identifying a quantity of commands in a buffer associated with one or more memory devices, the quantity of commands in the buffer comprising the observed information, wherein the component is configured to use the second quantity of pins, the second quantity of cycles, or both, based at least in part on the quantity of commands being greater than a threshold, and wherein the second quantity of pins is greater than the first quantity of pins, the second quantity of cycles is less than the first quantity of cycles, or both.

3. The method of claim 2, further comprising:
identifying, at a third time that occurs after the second time, a quantity of second commands in the buffer; and
configuring the component to use the first quantity of pins and the first quantity of cycles based at least in part on the quantity of second commands in the buffer being less than the threshold.

4. The method of claim 1, further comprising:
identifying a quantity of unused command slots in a time period, the quantity of unused command slots comprising the observed information, wherein the component is configured to use the second quantity of pins, the second quantity of cycles, or both, based at least in part on the quantity of unused command slots being greater than a threshold, and wherein the second quantity of pins is less than the first quantity of pins, the second quantity of cycles is greater than the first quantity of cycles, or both.

5. The method of claim 1, further comprising:
identifying, at a third time that occurs after the second time, an amount of power being consumed by one or more memory devices, wherein the component is configured to use a third quantity of pins, a third quantity of cycles, or both, based at least in part on the amount of power being greater than a threshold, and wherein the third quantity of pins is less than the first quantity of pins, the third quantity of cycles is greater than the first quantity of cycles, or both.

6. The method of claim 1, further comprising:
identifying, at a third time that occurs after the second time, a temperature of one or more memory devices, wherein the component is configured to use a third quantity of pins, a third quantity of cycles, or both, based at least in part on the temperature of the one or more memory devices being less than a threshold, and wherein the third quantity of pins is less than the first quantity of pins, the third quantity of cycles is greater than the first quantity of cycles, or both.

7. The method of claim 1, further comprising:
identifying, at a third time that occurs after the second time, a page hit rate for one or more memory devices, wherein the component is configured to use a third quantity of pins, a third quantity of cycles, or both, based at least in part on the page hit rate being greater than a threshold, and wherein the third quantity of pins is less than the first quantity of pins, the third quantity of cycles is greater than the first quantity of cycles, or both.

8. The method of claim 1, further comprising:
predicting, at a third time that occurs after the second time, access characteristics for one or more memory devices, wherein the component is configured to use a third quantity of pins, a third quantity of cycles, or both, based at least in part on the access characteristics.

9. The method of claim 1, wherein the channel comprises a plurality of channels between a host device and a memory device.

10. An apparatus, comprising:
one or more processors; and
memory storing instructions executable by the one or more processors to cause the apparatus to:
configure, at a first time, a component to use a first quantity of pins and a first quantity of cycles to communicate commands via a channel;
communicate, based at least in part on configuring the component at the first time, a command over the channel in accordance with the first quantity of pins and the first quantity of cycles; and
configure, at a second time that occurs after the first time, the component to use a second quantity of pins, a second quantity of cycles, or both, to communicate the commands via the channel, the first quantity of pins being different than the second quantity of pins, the first quantity of cycles being different than the second quantity of cycles, or both, wherein the component is configured to use the second quantity of pins, the second quantity of cycles, or both, based at least in part on observed information associated with the commands.

11. The apparatus of claim 10, wherein the instructions are further executable by the one or more processors to cause the apparatus to:
identify a quantity of commands in a buffer associated with one or more memory devices, the quantity of commands in the buffer comprising the observed information, wherein the component is configured to use the second quantity of pins, the second quantity of cycles, or both, based at least in part on the quantity of commands being greater than a threshold, and wherein the second quantity of pins is greater than the first quantity of pins, the second quantity of cycles is less than the first quantity of cycles, or both.

12. The apparatus of claim 10, wherein the instructions are further executable by the one or more processors to cause the apparatus to:
identify a quantity of unused command slots in a time period, the quantity of unused command slots comprising the observed information, wherein the component is configured to use the second quantity of pins, the second quantity of cycles, or both, based at least in part on the quantity of unused command slots being greater than a threshold, and wherein the second quantity of pins is less than the first quantity of pins, the second quantity of cycles is greater than the first quantity of cycles, or both.

13. The apparatus of claim 10, wherein the instructions are further executable by the one or more processors to cause the apparatus to:
identify, at a third time that occurs after the second time, an amount of power being consumed by one or more memory devices, wherein the component is configured to use a third quantity of pins, a third quantity of cycles, or both, based at least in part on the amount of power being greater than a threshold, and wherein the third quantity of pins is less than the first quantity of pins, the third quantity of cycles is greater than the first quantity of cycles, or both.

14. The apparatus of claim 10, wherein the instructions are further executable by the one or more processors to cause the apparatus to:
identify, at a third time that occurs after the second time, a temperature of a memory device, wherein the component is configured to use a third quantity of pins, a third quantity of cycles, or both, based at least in part on the temperature of the memory device being less than a threshold, and wherein the third quantity of pins is less than the first quantity of pins, the third quantity of cycles is greater than the first quantity of cycles, or both.

15. The apparatus of claim 10, wherein the instructions are further executable by the one or more processors to cause the apparatus to:
identify, at a third time that occurs after the second time, a page hit rate for one or more memory devices, wherein the component is configured to use a third quantity of pins, a third quantity of cycles, or both, based at least in part on the page hit rate being greater than a threshold, and wherein the third quantity of pins is less than the first quantity of pins, the third quantity of cycles is greater than the first quantity of cycles, or both.

16. The apparatus of claim 10, wherein the instructions are further executable by the one or more processors to cause the apparatus to:
predict, at a third time that occurs after the second time, access characteristics for one or more memory devices, wherein the component is configured to use a third quantity of pins, a third quantity of cycles, or both, based at least in part on the access characteristics.

17. A non-transitory, computer-readable medium storing code that comprises instructions executable by one or more processors of an electronic device to cause the electronic device to:
configure, at a first time, a component to use a first quantity of pins and a first quantity of cycles to communicate commands via a channel;
communicate, based at least in part on configuring the component at the first time, a command over the channel in accordance with the first quantity of pins and the first quantity of cycles; and
configure, at a second time that occurs after the first time and based at least in part on observed information associated with the commands, the component to use a second quantity of pins, a second quantity of cycles, or both, to communicate the commands via the channel, the first quantity of pins being different than the second quantity of pins, the first quantity of cycles being different than the second quantity of cycles, or both.

18. The non-transitory, computer-readable medium of claim 17, wherein the instructions are further executable by the one or more processors to cause the electronic device to:

identify a quantity of commands in a buffer associated with one or more memory devices, the quantity of commands in the buffer comprising the observed information, wherein the component is configured to use the second quantity of pins, the second quantity of cycles, or both, based at least in part on the quantity of commands being greater than a threshold, and wherein the second quantity of pins is greater than the first quantity of pins, the second quantity of cycles is less than the first quantity of cycles, or both.

19. The non-transitory, computer-readable medium of claim 17, wherein the instructions are further executable by the one or more processors to cause the electronic device to:
identify a quantity of unused command slots in a time period, the quantity of unused command slots comprising the observed information, wherein the component is configured to use the second quantity of pins, the second quantity of cycles, or both, based at least in part on the quantity of unused command slots being greater than a threshold, and wherein the second quantity of pins is less than the first quantity of pins, the second quantity of cycles is greater than the first quantity of cycles, or both.

20. The non-transitory, computer-readable medium of claim 17, wherein the instructions are further executable by the one or more processors to cause the electronic device to:
identify, at a third time that occurs after the second time, an amount of power being consumed by one or more memory devices, wherein the component is configured to use a third quantity of pins, a third quantity of cycles, or both, based at least in part on the amount of power being greater than a threshold, and wherein the third quantity of pins is less than the first quantity of pins, the third quantity of cycles is greater than the first quantity of cycles, or both.

* * * * *